United States Patent
Rottenberg et al.

(10) Patent No.: US 11,392,088 B2
(45) Date of Patent: Jul. 19, 2022

(54) OPTICAL DEVICE, A SYSTEM AND A METHOD FOR FORMING A DISTRIBUTION OF A THREE-DIMENSIONAL LIGHT FIELD

(71) Applicant: IMEC VZW, Leuven (BE)

(72) Inventors: Xavier Rottenberg, Kessel-Lo (BE); Kristof Lodewijks, Wilsele (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/975,113

(22) PCT Filed: Feb. 19, 2019

(86) PCT No.: PCT/EP2019/054116
§ 371 (c)(1),
(2) Date: Aug. 21, 2020

(87) PCT Pub. No.: WO2019/162282
PCT Pub. Date: Aug. 29, 2019

(65) Prior Publication Data
US 2021/0088969 A1  Mar. 25, 2021

(30) Foreign Application Priority Data
Feb. 22, 2018  (EP) ................... 18157987

(51) Int. Cl.
*G03H 1/22* (2006.01)
*G02F 1/135* (2006.01)
(Continued)

(52) U.S. Cl.
CPC ......... *G03H 1/2294* (2013.01); *G02F 1/1313* (2013.01); *G02F 1/1354* (2013.01);
(Continued)

(58) Field of Classification Search
CPC ................ G03H 1/2294; G03H 1/02; G03H 2001/2655; G02F 1/1313; G02F 1/13306; G02F 1/01
See application file for complete search history.

(56) References Cited

U.S. PATENT DOCUMENTS

2006/0119774 A1   6/2006 Chen
2010/0309539 A1  12/2010 Bresenhan et al.
(Continued)

FOREIGN PATENT DOCUMENTS

CN       106873340 A     6/2017
WO   WO-2016125491 A1    8/2016
(Continued)

OTHER PUBLICATIONS

Peiman Hosseini et al: "An optoelectronic framework enabled by low-dimensional phase-change films", Nature, vol. 511, No. 7508, Jul. 9, 2014 (Jul. 9, 2014), pp. 206-211, XP055130931, ISSN: 0028-0836, DOI: 10.1038/nature13487 the whole document.
(Continued)

*Primary Examiner* — Donald L Raleigh
(74) *Attorney, Agent, or Firm* — Moser Taboada

(57) ABSTRACT

An optical device (100) for forming a distribution of a three-dimensional light field comprises: an array (102) of unit cells (104), a unit cell (104) being individually addressable for switching the optical property of the unit cell (104) between a first and a second condition; wherein the unit cells (104) are configured to be selectively active or inactive and wherein the array (102) comprises at least a first and a second disjoint subset (110; 112; 114; 116), and wherein the unit cells (104) in a subset (110; 112; 114; 116) are configured to be jointly switched from inactive to active, wherein the active unit cells (104) are configured to interact with an incident light beam (106) for forming the distribution of the three-dimensional light field; and wherein the optical device (100) is configured to address inactive unit cells (104) for switching the optical property of unit cells (104).

15 Claims, 11 Drawing Sheets

(51) Int. Cl.
  *G03H 1/02* (2006.01)
  *G02F 1/1362* (2006.01)
  *G02F 1/13* (2006.01)
  *G02F 1/133* (2006.01)
  *G02F 1/1335* (2006.01)
  *G02F 1/13357* (2006.01)

(52) U.S. Cl.
  CPC ...... *G02F 1/13306* (2013.01); *G02F 1/13362* (2013.01); *G02F 1/133528* (2013.01); *G02F 1/136209* (2013.01); *G03H 1/02* (2013.01)

(56) References Cited

U.S. PATENT DOCUMENTS

| | | | |
|---|---|---|---|
| 2011/0242150 A1* | 10/2011 | Song | H04N 13/366 345/697 |
| 2012/0105311 A1 | 5/2012 | Benoit et al. | |
| 2015/0098032 A1 | 4/2015 | Park | |
| 2015/0160612 A1 | 6/2015 | Jae-Eun et al. | |
| 2017/0199400 A1 | 7/2017 | Rang-Kyun et al. | |
| 2018/0017840 A1 | 1/2018 | John et al. | |
| 2018/0122116 A1* | 5/2018 | Jang | G06T 11/60 |
| 2018/0267468 A1 | 9/2018 | Chen et al. | |

FOREIGN PATENT DOCUMENTS

| | | |
|---|---|---|
| WO | WO-2017064509 A1 | 4/2017 |
| WO | WO-2019162282 A1 | 8/2019 |

OTHER PUBLICATIONS

Ma J, "Advanced MEMS-based technologies and displays", Displays, vol. 37, pp. 2-10, 2015.

Written Opinion and International Search Report in PCT/EP2019/054116 dated Mar. 29, 2019.

* cited by examiner

OPTICAL DEVICE, A SYSTEM AND A METHOD FOR FORMING A DISTRIBUTION OF A THREE-DIMENSIONAL LIGHT FIELD

TECHNICAL FIELD

The present inventive concept relates to an optical device for forming a distribution of a three-dimensional light field. In particular, the present inventive concept relates to an optical device which may form a three-dimensional light field to display a holographic image.

BACKGROUND

A holographic image is formed by a three-dimensional control of a light field. In particular, if it is desired to present a changing holographic image, such as in presenting of holographic video, an optical device for forming the three-dimensional light field may need to be controlled so as to change properties.

An optical device for forming a distribution of a three-dimensional light field may comprise an array of unit cells. The array of unit cells may interact with an incident light beam in order to together form a desired three-dimensional light field. The unit cells may thus need to be controlled in order to control interaction with light of each of the unit cells such that the desired three-dimensional light field is formed. Therefore, when a new holographic image is to be presented, a large number of unit cells need to be reconfigured to the desired state in order to change the holographic image being presented.

Thus, holographic video projectors require writing of large amounts of data in the array of unit cells. For a typical holographic video projector, tens of Gb of data needs to be written with a pitch (distance between adjacent unit cells) of 100 nm in a time frame in the order of 10 ms in order for an experience to a viewer watching the holographic video not to be hampered.

The writing of such amounts of data is a very difficult task.

SUMMARY

An objective of the present inventive concept is to provide an improved optical device, which may be used for improved control of distribution of a three-dimensional light field. A specific objective of the present inventive concept is to provide an optical device, which at least alleviates a problem of writing very large amounts of data to an array of unit cells for displaying of holographic video.

These and other objectives of the invention are at least partly met by the invention as defined in the independent claims. Preferred embodiments are set out in the dependent claims.

According to a first aspect, there is provided an optical device for forming a distribution of a three-dimensional light field, said optical device comprising: an array of unit cells, wherein a unit cell in the array of unit cells is individually addressable for controlling an optical property of the unit cell, wherein addressing of the unit cell is configured to switch the optical property of the unit cell between a first condition of the optical property and a second condition of the optical property; wherein the unit cells in the array of unit cells are configured to be selectively active or inactive and wherein the array of unit cells comprise at least a first subset of unit cells and a second subset of unit cells, wherein the first subset and the second subset are disjoint, and wherein the unit cells in a subset of unit cells are configured to be jointly switched from being inactive to being active, wherein the active unit cells are configured to interact with an incident light beam and cooperate in forming the distribution of the three-dimensional light field; and wherein the optical device is configured to address inactive unit cells for switching the optical property of unit cells when the unit cells are inactive.

Thanks to the optical device according to the first aspect, an array of unit cells comprises a first and a second subset. Unit cells may thus be selectively inactive or active, wherein only the active unit cells contribute to the forming of a distribution of the three-dimensional light field at a given point in time. This implies that the inactive unit cells may be addressed, while being inactive, for writing information representing a next holographic image to be displayed into the inactive unit cells. The writing of information is performed by controlling a condition of the optical property of the respective unit cells. Thus, there is a relatively lenient requirement on a writing time for providing the information on the next holographic image to the inactive unit cells, as the information may be written while a previous image is being displayed.

The use of at least a first subset and a second subset of unit cells implies that all unit cells are not simultaneously used in forming of the distribution of the three-dimensional light field. Hence, a trade-off of resolution, brightness and quality of a holographic image may be made in order to enable writing large amounts of information to the array of unit cells for displaying a holographic video.

The unit cells may need to be individually addressed in order to switch a condition of the optical property of the unit cells for forming a desired distribution of the three-dimensional light field. Each unit cell may have an individually set condition of the optical property such that the desired distribution is formed. This implies that the unit cells may need to be addressed individually in order to control the condition of the optical property of each unit cell, which is a time-consuming operation or requires a very large number of parallel control lines for addressing the unit cells. However, by performing the individual addressing of unit cells to inactive unit cells while a holographic image is displayed based on active unit cells, there is a substantial increase in the available time for addressing of unit cells (as a typical frame rate of 25 frames per second correspond to a single image being displayed for a period of approximately 40 ms).

The switching of a subset of unit cells from being inactive to being active (or vice versa) may be performed in a very fast manner. Since the conditions of the optical properties of the unit cells of the subset have been set in individual addressing of the unit cells, a common operation may be performed to all the unit cells in the subset for ensuring that the unit cells in the subset are switched from being inactive to being active. Thus, the unit cells in the subset may be jointly switched from being inactive to being active using a single control signal that applies to all the unit cells in the subset.

The joint switching of the unit cells from being inactive to being active may be performed using a single control signal such that all unit cells in the subset may be switched simultaneously. However, it should be realized that the subset may be associated with a plurality of control lines, wherein each control line may control a plurality of unit cells in the subset. Thus, the joint switching may be performed using a sequence of control signals on the plurality (but small number) of control lines so as to switch the unit cells from being inactive to being active. The joint switching may still be performed in such a short time as to not affect experience of a viewer looking at a holographic video.

The joint switching of the unit cells should thus be construed as the unit cells being simultaneously switched or, if the switching is not exactly simultaneously performed, it should be performed fast enough as to not hamper viewer experience. This may be realized by common operation may be controlled in a pre-defined manner. For instance, the common operation may be triggered by a packet of control signals forming a sequence of control signals supplied on a plurality of control lines.

As will be exemplified in various embodiments below, the switching of the unit cells from being inactive to being active may be performed e.g. using a light shutter structure associated with the unit cells.

It should be realized that the array of unit cells may comprise more than two mutually disjoint subsets of unit cells. This may provide even more time for individually addressing the unit cells in a subset for writing information to the unit cells. The unit cells of a subset are only active for ⅓ of the time using three subsets, ¼ of the time using four subsets, and so on. However, in some implementations, a resolution of the holographic image may be even more affected if further subsets of unit cells are used.

It should be realized that the forming of the distribution of a three-dimensional light field may be used in several different applications, such as in displaying of holographic video as discussed above, e.g. in any type of application for controlled illumination.

It should also be realized that the distribution of the three-dimensional light field based on an active subset may contribute only to part of a holographic image that is perceived by a viewer. Based on persistence of vision, holographic images formed in a fast sequence may be perceived as together displaying a complete holographic image. Thus, the distribution of a three-dimensional light field formed based on a first active subset may together with the distribution of a three-dimensional light field formed based on a second active subset, shortly after the distribution of the first active subset was formed, be perceived by a viewer as a complete holographic image.

According to an embodiment, the unit cells of the first subset are arranged interleaved with the unit cells of the second subset in the array of unit cells.

This implies that the unit cells of the first subset may be spread out over the entire array of unit cells. Likewise, the unit cells of the first subset may be spread out over the entire array of unit cells.

In one embodiment, every other unit cell is part of the first subset and every other unit cell is part of the second subset. This implies that each unit cell of the first subset is arranged in-between two unit cells of the second subset and that each unit cell of the second subset is arranged between two unit cells of the first subset. In such embodiment, the unit cells in a subset are evenly spread out over the entire array of unit cells, which may facilitate forming of a holographic image of high quality throughout a series of sequentially projected holographic images.

In another embodiment, the unit cells of each subset may be spread out in clusters of n×m unit cells. Each cluster of unit cells of the first subset may be arranged between two clusters of unit cells of the second subset, and vice versa.

It should be realized that other configurations of interleaved subsets are possible. In particular, the array of unit cells may comprise more than two subsets, wherein the unit cells of all subsets may be interleaved. The unit cells in a subset may e.g. form a regular pattern in the array of unit cells, such that single unit cells or cluster of unit cells belonging to the subset may be evenly distributed in the array of unit cells.

According to an embodiment, the first subset of unit cells forms a first sub-array of unit cells and the second subset of unit cells forms a second sub-array of unit cells and wherein the first sub-array and the second sub-array are arranged adjacent to each other on a common substrate.

This implies that each subset of unit cells may be associated with a separate area in the array of unit cells. Hence, a distance between two adjacent unit cells that are part of the same subset is equal to the distance between two adjacent unit cells in the array of unit cells. Therefore, using such arrangement of the subset, a resolution of a holographic image need not be affected by the array of unit cell being divided into two or more subsets.

However, the plural subsets still imply that all unit cells are not simultaneously used when displaying a holographic image at a given point in time. Therefore, the entire array of unit cells may still need to be larger than an array of unit cells that would not be divided into plural subsets.

According to an embodiment, each subset of unit cells comprise first unit cells configured to interact with a first wavelength of light and second unit cells configured to interact with a second wavelength of light different from the first wavelength of light.

This implies that the optical device may be configured to form a distribution of a three-dimensional light field for multiple wavelengths, such that a multi-color holographic image may be formed. Each of the subsets may thus comprise first unit cells dedicated for interaction with a first wavelength and second unit cells dedicated for interaction with a second wavelength, so as to enable displaying of a multi-color holographic image at any given time when only the unit cells of a single subset may be active.

An active subset may receive a sequence of incident light beams of different wavelengths. Thanks to persistence of vision, a viewer looking at a holographic image may perceive a fast sequence of holographic images formed by illuminating an active subset by a sequence of incident light beams of different colors as a single multi-color holographic image.

It should be realized that the optical device may be configured to form multi-color images using more than two wavelengths, such that each subset of unit cells may then also comprise third unit cells configured to interact with a third wavelength, and so on.

In one embodiment, a unit cell may be associated with a color filter for controlling a wavelength of light with which the unit cell will interact.

According to an embodiment, the optical device further comprises a light shutter structure arranged in relation to the array of unit cells, wherein the light shutter structure is controllable for selecting whether incident light on the light shutter structure reaches a unit cell with which the light shutter structure is associated for selecting whether the unit cell is being inactive or being active.

The light shutter structure may be integrated with a substrate on which the array of unit cells is formed. However, the light shutter structure may alternatively be arranged separately from the substrate and may e.g. be associated with a light source or arranged between the light source and the array of unit cells.

The light shutter structure may be arranged such that unit cells of a subset are associated with the light shutter structure in such a manner that when the light shutter structure is controlled, the unit cells in the subset will be jointly switched from being inactive to being active (or vice versa).

According to an embodiment, the light shutter structure comprises a first light shutter which is shared by the first subset of unit cells and a second light shutter which is shared by the second subset of unit cells.

Thus, the first light shutter may be associated with all unit cells of the first subset and the second light shutter may be associated with all unit cells of the second subset. This implies that controlling of the first light shutter may jointly switch the unit cells of the first subset from being inactive to being active or vice versa. Similarly, controlling of the second light shutter may jointly switch the unit cells of the second subset from being inactive to being active or vice versa.

Hence, the first light shutter may be formed as a single structure, which may be controlled by a single control signal, and the second light shutter may be formed as another single structure, which may also be controlled by a single control signal (different from the control signal controlling the first light shutter). For instance, the first light shutter and/or the second light shutter may comprise a plurality of lines arranged above the unit cells of the subset associated with the light shutter. The plurality of lines may be interconnected, e.g. at an end, such that a single control signal may switch the unit cells of the subset from being inactive to being active or vice versa.

According to an embodiment, the light shutter structure comprises an array of light shutter units, wherein each light shutter unit is associated with a single unit cell, and wherein the light shutter units associated with the first subset are configured to be jointly controlled for switching the unit cells in the first subset from being inactive to being active.

Thus, the light shutter structure may comprise separate light shutter units forming a one-to-one relationship between light shutter units and unit cells in the array. Since a common operation is to be performed on the light shutter units associated with a subset when the unit cells of the subset are to be switched from being active to being inactive, the light shutter units need not be individually addressed for providing a control signal for switching a state of the light shutter units. Rather, the light shutter units associated with the first subset may be configured to be jointly controlled, e.g. so that control signals are simultaneously or jointly provided to the light shutter units associated with the first subset.

According to an embodiment, the optical device comprises a control unit providing control signals to the light shutter structure, wherein a control signal is configured to control whether incident light on the light shutter structure reaches a unit cell with which the light shutter structure is associated based on changing a state of a phase-change material, changing a state of a liquid crystal for controlling light passing through polarization filters, inducing an electro-optical effect, inducing a magneto-optical effect, changing a polarization of light being transmitted by a polarization filter, activating a movement of an actuator in a microelectromechanical or nano-electromechanical system, or activating a macroscopic mechanical shutter.

Thus, a function of controlling whether incident light is to be received by a unit cell in a subset may be achieved in various ways. The way of controlling whether incident light on the light shutter structure is allowed to pass to a unit cell may be chosen e.g. in relation to effectiveness of preventing light from reaching the unit cell, size of a controlling structure, a pitch of light shutter units and/or complexity of the controlling structure.

According to an embodiment, the light shutter structure comprises control lines for sending control signals for selecting whether incident light on the light shutter structure reaches a unit cell with which the light shutter structure is associated. The control signals may be configured to trigger a local function in the unit cell for switching a condition of an optical property of the unit cell.

In another embodiment, the optical device comprises a control unit providing control signals to the light shutter structure, wherein the light shutter structure is arranged to receive light being transmitted by the array of unit cells, and wherein a control signal is configured to control whether incident light on the light shutter structure is allowed to contribute to the forming of the distribution of the three-dimensional light field. The control of the light shutter structure may be based on changing a state of a phase-change material, changing a state of a liquid crystal for controlling light passing through polarization filters, inducing an electro-optical effect, inducing a magneto-optical effect, changing a polarization of light being transmitted by a polarization filter, activating a movement of an actuator in a microelectromechanical system, or activating a macroscopic mechanical shutter.

According to an embodiment, the optical device comprises a set of passive polarization filters arranged in relation to the array of unit cells, wherein the first subset of unit cells is associated with a first polarization filter configured to transmit light of a first polarization, and wherein the second subset of unit cells is associated with a second polarization filter configured to transmit light of a second polarization different from the first polarization.

The set of passive polarization filters may be integrated with a substrate on which the array of unit cells is formed. However, the set of passive polarization filters may alternatively be arranged separately from the substrate and may e.g. be associated with a light source or arranged between the light source and the array of unit cells.

Each subset may thus be associated with a specific polarization of light. Hence, by switching a polarization of light of the incident light beam, unit cells of a subset may be switched from being inactive to being active.

The first polarization filter and the second polarization filter may be configured to transmit orthogonal linear polarization states of incident light or left-handed circular polarization state and right-handed circular polarization state, respectively.

According to an embodiment, the unit cells comprise a phase-change material, which may be switched between a first state and a second state, wherein switching of the phase-change material between the first state and the second state is configured to switch the optical property of the unit cell between a first condition of the optical property and a second condition of the optical property.

A phase-change material may be advantageously used for controlling a condition of the optical property of a unit cell. For instance, reflectivity or transmission of a unit cell may be highly dependent on a state of the phase-change material. Hence, by switching state of the phase-change material of a unit cell, contribution of the unit cell to the forming of the distribution of the three-dimensional light field may be controlled. Thus, by setting states of each of the unit cells in a subset, a desired distribution of the three-dimensional light field may be defined.

The phase-change material may be combined with other materials, e.g. in a stack of layers of materials, wherein a state of the phase-change material may control a condition of an optical property of the stack of layers of materials. It should thus be realized that the unit cell may be formed in various configurations including a phase-change material.

A switching of a state of a phase-change material may be induced in many different manners, e.g. by thermal activation or exerting the phase-change material to an electric or magnetic field. It should be realized that the controlling of the state of the phase-change material may be provided by individually addressing the unit cell, e.g. by sending a control signal to electrodes associated with the unit cell for inducing the switching of the state of phase-change material locally in the unit cell.

According to an embodiment, the active unit cells are configured to cooperate in reflecting an incident light beam for forming the distribution of the three-dimensional light field.

According to another embodiment, the active unit cells are configured to cooperate in transmitting an incident light beam for forming the distribution of the three-dimensional light field.

Thus, it should be realized that the optical device may be configured either for reflective or transmissive forming of the distribution of the three-dimensional light field. The choice whether the optical device should be configured to be reflective or transmissive may be made depending on a desired application. Also, some techniques for implementing the light shutter structure may be more suited e.g. for using a transmissive optical device, such as if using a light shutter structure which is configured to reflect an incident light beam for inactive unit cells.

According to a second aspect, there is provided a system for forming a distribution of a three-dimensional light field, said system comprising: the optical device according to the first aspect; and a light source configured to emit a light beam to be incident on the array of unit cells.

Effects and features of this second aspect are largely analogous to those described above in connection with the first aspect. Embodiments mentioned in relation to the first aspect are largely compatible with the second aspect.

Thus, the system may comprise both an optical device for controlling the distribution of the three-dimensional light field and a light source for providing a light beam for forming the three-dimensional light field when interacting with the optical device.

The system may comprise a housing in which the optical device and the light source are mounted, such that a well-controlled and pre-defined relationship between the light source and the optical device may be provided.

According to an embodiment, the system further comprises a controller for controlling a polarization of light emitted by the light source.

The polarization of light may be used for switching which unit cells are active, e.g. when using a set of passive polarization filters. The controller may thus control that the polarization of light emitted by the light source is switched at an appropriate point in time for forming of a desired distribution of the three-dimensional light field.

The controller may be configured to also control individual addressing of the unit cells for writing information to inactive unit cells for a next holographic image to be displayed. However, the system may alternatively comprise a separate controller for controlling switching of the condition of the optical property of the unit cells. In such case, the plural controllers may be synchronized for ensuring that changing of polarization of light emitted by the light source is performed at an appropriate point in time.

According to a third aspect, there is provided a method for forming a distribution of a three-dimensional light field, said method comprising:
receiving a light beam incident on an array of unit cells; selecting a first subset of unit cells to be active and a second subset of unit cells to be inactive, wherein the first subset of unit cells is disjoint from the second subset of unit cells; individually addressing the unit cells in the second subset of unit cells, while the unit cells in the second subset are inactive, in order to control the optical property of the unit cell to one of at least a first condition of the optical property and a second condition of the optical property, wherein the second subset of unit cells is programmed by the individual addressing of the unit cells for forming a distribution of the three-dimensional light field; jointly switching the first subset of unit cells to be inactive; and jointly switching the second subset of unit cells to be active for changing the distribution of the three-dimensional light field to the distribution programmed in the second subset of unit cells.

Effects and features of this third aspect are largely analogous to those described above in connection with the first and second aspects. Embodiments mentioned in relation to the first and second aspect are largely compatible with the third aspect.

The method enables writing of information to inactive unit cells, such that a relatively lenient requirement on a writing time is provided even if a holographic video is to be presented based on the forming of distribution of the three-dimensional light field. Further, the unit cells of a subset may be jointly switched from being inactive to being active or vice versa for very fast switching between a current distribution of the three-dimensional light field and a next distribution of the three-dimensional light field, e.g. in switching from a current frame to a next frame in a holographic video.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
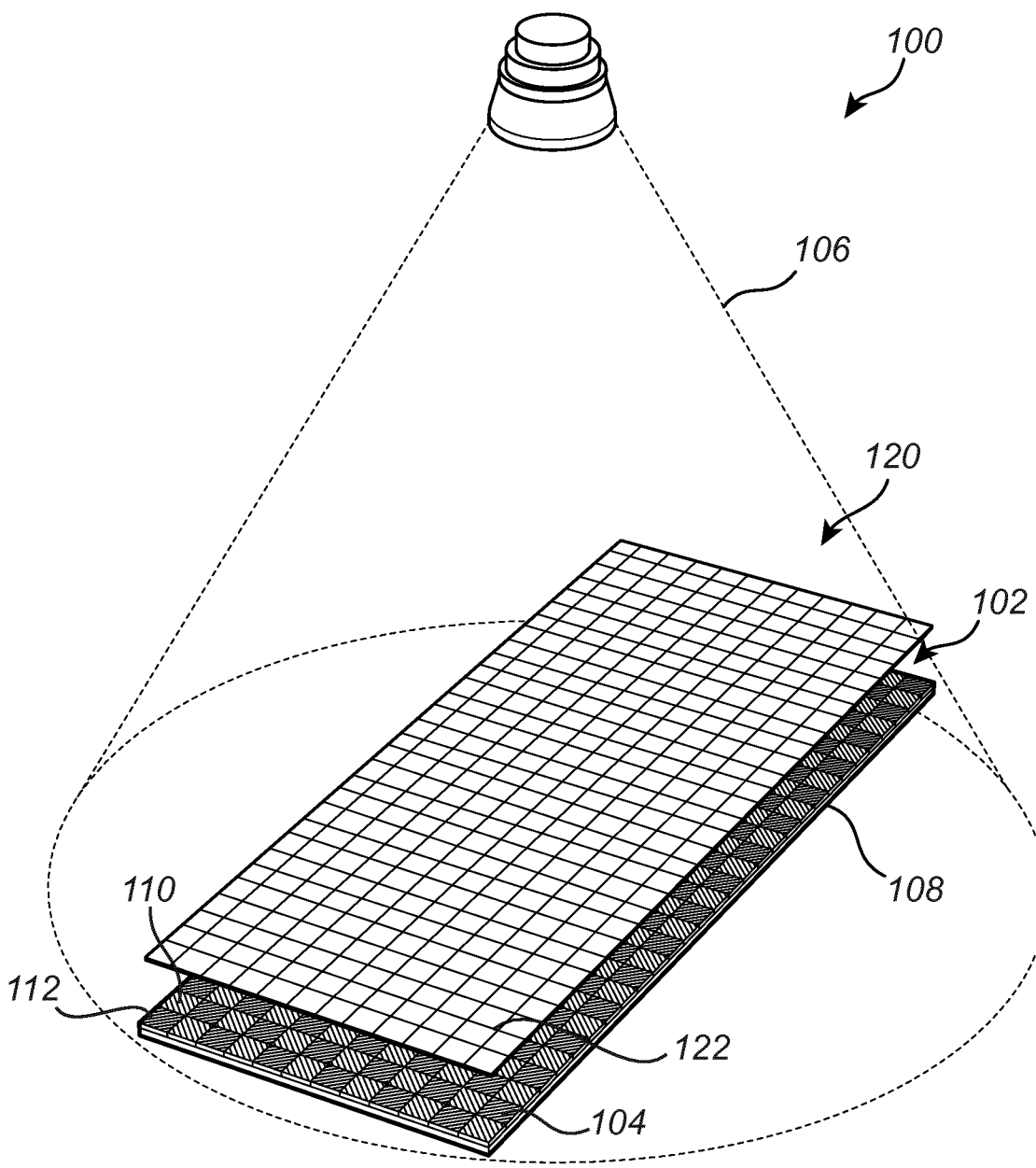
FIG. 1 is a schematic view of an optical device according to an embodiment.

Referring now to FIG. 1, an optical device 100 will be generally described. The optical device 100 may comprise an array 102 of unit cells 104. Unit cells in the array 102 of unit cells 104 may be individually addressable for controlling an optical property of the unit cell 104 and hence controlling an optical response of the array 102 of unit cells 104.

Each unit cell 104 may be individually addressable. However, it should be realized that not necessarily each and every one of the unit cells 104 is individually addressable.

By controlling the optical property of the unit cells 104, an effect on a light beam 106 incident on the array 102 may be controlled. Thus, the unit cells 104 may in combination form a controllable effect on the incident light beam 106. Thus, the array 102 may be used for forming and controlling a distribution of a three-dimensional light field based on the incident light beam 106.

The three-dimensional light field may for instance be used for displaying a holographic image. Thanks to the unit cells 104 being controllable, a change in the holographic image formed may be provided. This implies that the optical device 100 may be used for displaying a video of holographic images.

However, it should be realized that control of a three-dimensional light field may be useful in other applications as well. The optical device 100 for forming a three-dimensional light field may project a controlled distribution in three dimensions of an incident light beam, which may be used in any type of application for controlled illumination and need not necessarily be combined with forming of a displayed image based on the three-dimensional light field.

The optical device 100 may be set up for reflecting the incident light beam 106 or transmission of the incident light beam 106. The light beam 106 may be formed by a coherent light source, such as the light beam 106 being a laser beam, which provides a well-defined relation of the incident light field on the array 102 of unit cells 104 and, hence, is suitable for using as a basis for forming the desired distribution of the three-dimensional light field using the array 102 of unit cells 104.

Each unit cell 104 may comprise a phase-change material (PCM), which may be switched between a first state and a second state, wherein switching of the PCM between the first state and the second state is configured to switch the optical property of the unit cell 104 between a first condition of the optical property and a second condition of the optical property.

The PCM may be configured to switch between a crystalline state and an amorphous state. However, it should be realized that the first and second states may be other configurations of states of the PCM. For instance, the PCM may be configured to switch between two different crystalline states.

The unit cell 104 may comprise a layer of PCM, which may be combined with other materials, e.g. in a stack of layers of materials, such that the combination of materials may define an optical property of the unit cell. The switching of a state of the PCM may then affect the optical property of, for instance, the stack of layers in the unit cell 104, such that a condition of the optical property of the unit cell 104 may be controlled by a state of the PCM.

For instance, the switching of state of the PCM may affect refractive index and/or permittivity of the PCM, such that e.g. a PCM layer or a stack comprising a PCM layer may be switched from a highly reflective to a low reflective state for a given wavelength of incident light.

The unit cell 104 may thus comprise a PCM layer for controlling a condition of the optical property of the unit cell 104. For instance, reflectivity or transmission of the unit cell for a given wavelength may be configured to be highly dependent on the state of the PCM.

According to an embodiment, the PCM is a compound of germanium, antimony and tellurium. For instance, the PCM may be formed by $Ge_2Sb_2Te_5$ (GST). This is a material which may change between an amorphous state and a crystalline state and which may suitably be used for providing desired optical properties of the array 102 of unit cells 104.

However, it should be realized that the PCM may be any material which provides a change in optical property based on the switching between two states. The PCM may for instance be any material which may undergo a phase change in relation to being exposed to a temperature (a thermochromic material) or in relation to being exposed to light (a photochromic material) or a combination of such materials. For example, a number of different forms of vanadium oxides, such as $VO_2$ and $V_2O_3$, may be used. The PCM may include thermochromic materials formed from metal-oxide materials, such as vanadium oxide as mentioned above, polymers, such as azobenzene-containing polydiacetylenes, or nanostructured polymers, such as diblock (poly [styrene-b-isoprene]) copolymers. The PCM may alternatively be an electro-optic material that changes a condition of an optical property based on an applied electric field, such as a birefringent material, or a magneto-optic material that changes a condition of an optical property based on an applied magnetic field, such as garnets and ferro-magnetic metals.

In the specific case of using GST as the PCM, switching the material modifies the structure from a plasmonic (crystalline state) to a dielectric (amorphous state) antenna, which will exhibit very similar resonances but at different wavelengths, allowing to change a structure in the unit cell 104 from a highly reflective to a low reflective state for a given wavelength.

Upon switching of the state of GST, the optical properties are significantly altered, resulting in large changes in both real and imaginary parts of refractive index and permittivity. It should be noted that in its crystalline state, GST has a negative real part of the permittivity, which implies that it shows metallic behavior and therefore supports plasmonic resonances. In its amorphous state, GST has a positive real part of the permittivity, accompanied with a large imaginary part, meaning that it acts as a highly lossy dielectric.

The PCM in a unit cell 104 could be switched thermally (as for GST) but is not limited to that. It should be realized that in different embodiments, electro-optic materials, and magneto-optic materials may be used as alternative implementations.

It should be realized that the controlling of the state of the PCM may be provided by individually addressing the unit cell 104, e.g. by sending a control signal to electrodes associated with the unit cell 104 for inducing the switching of the state of phase-change material locally in the unit cell, e.g. by local heating of the PCM, or by exerting the PCM to a local electric or magnetic field.

The optical device 100 may suitably be used with visible wavelengths, as this implies that the three-dimensional light field may be seen by people. In many applications, such as for creation of holographic images, use of visible wavelengths is desired. However, the optical device 100 may alternatively be used with other wavelengths, such as near-infrared, infrared, or ultraviolet wavelengths. The unit cells 104 may therefore be configured so that the switching of conditions of an optical property of the unit cell 104 provide a strong effect of the unit cell 104 on a desired operational wavelength.

The array 102 of unit cells 104 may comprise a plurality of subsets 110, 112 of unit cells 104, the subsets 110, 112 being indicated in FIG. 1 by different hatchings of the unit cells 104. The subsets 110, 112 may be disjoint, such that each unit cell 104 in the array 102 is part of a single subset.

The unit cells 104 in a subset 110, 112 may be jointly controlled between being active or inactive. When a unit cell 104 is active, the unit cell 104 is part of a set of unit cells 104 which together define a distribution of the three-dimensional light field. When a unit cell 104 is inactive, the unit cell 104 is not part of the set of unit cells 104 for defining the distribution of the three-dimensional light field currently being formed by the optical device 100.

Thus, the subsets 110, 112 may be switched between being active or inactive. For an active subset 110, 112, all the unit cells 104 of the subset 110, 112 are active and contribute to defining a distribution of the three-dimensional light field formed by the optical device 100. For an inactive subset 110, 112, all the unit cells 104 of the subset 110, 112 are inactive and do not contribute to defining a distribution of the three-dimensional light field formed by the optical device 100.

The optical device 100 may have at least one active subset 110, 112, when forming a distribution of a three-dimensional light field. Thus, one or more subsets 110, 112 may be active at a time. For simplicity in determining in which condition of the optical property each unit cell 104 should be set, only a single subset 110, 112 may be active at a time.

When a unit cell 104 is inactive, the unit cell 104 does not contribute to the forming of the distribution of the three-dimensional light field. Thus, the unit cell 104 may, while being inactive, be switched for controlling whether the unit cell 104 may be set to the first condition of the optical property or the second condition of the optical property. This implies that the inactive subset 110, 112 may be prepared, while being inactive, with each unit cell 104 set to a desired condition of the optical property, such that when the subset 110, 112 is switched from being inactive to being active, the active unit cells 104 in the subset 110, 112 may immediately ensure that a desired distribution of the three-dimensional light field is formed by the optical device 100.

In this manner, the use of inactive subsets 110, 112, enables writing of information of a next frame (distribution of a three-dimensional light field) to be written to unit cells 104 in an inactive subset 110, 112. Thus, a time for performing the writing operation may be relatively long without e.g. affecting the experience of a viewer watching a holographic video.

Then, when the optical device 100 is to be updated from forming a current distribution of the three-dimensional light field to forming a next distribution of the three-dimensional light field, a very fast operation may be performed by switching an active subset 110, 112 to being inactive and switching an inactive subset 110, 112 to being active.

A periodicity of active unit cells 104 may be below the operational wavelength in order to ensure that an accurate control of the formed distribution of the three-dimensional light field is obtained. The periodicity may preferably even be below half of the operational wavelength for even more accurate control. In an embodiment, the periodicity of active unit cells 104 may thus be in an order of 100 nm.

The optical device 100 may comprise a light shutter structure 120, which may have an individual shutter 122 associated with each of the subsets 110, 112 for jointly controlling whether the subset 110, 112 is active or inactive.

The light shutter structure 120 may comprise a plurality of shutters 122, wherein each shutter 122 may be associated with a plurality of unit cells 104 within a single subset 110, 112. In some embodiments, a single shutter 122 may be associated with all unit cells 104 of a subset 110, 112.

The light shutter structure 120 may be implemented in many different ways, as will be explained in detail below, and may be active or passive. In particular for a passive light shutter structure 120, a property of the incident light beam 106 may also be controlled for controlling interaction between the light beam 106 and the light shutter structure 120 and thus defining whether a subset 110, 112 is active or inactive. For instance, a polarization of the light beam 106 may be controlled.

Figure 2A:
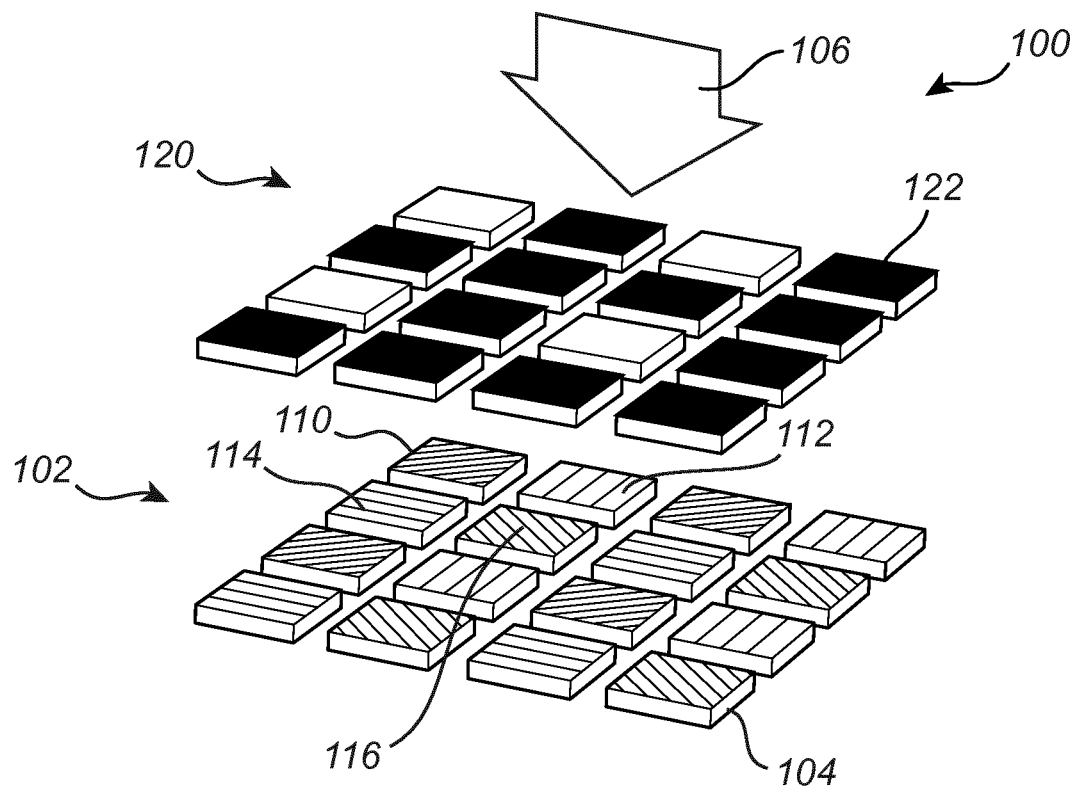
FIGS. 2a-b are schematic views illustrating optical devices in a reflective and a transmissive geometry.
Figure 2A:
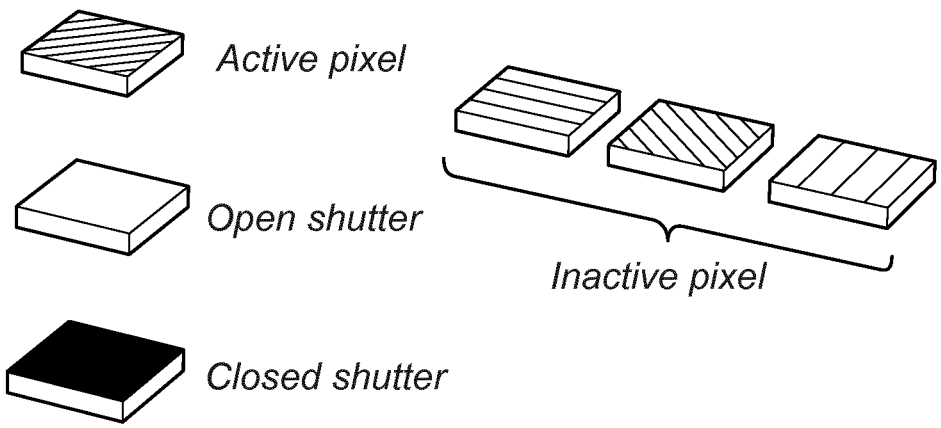
Figure 2B:
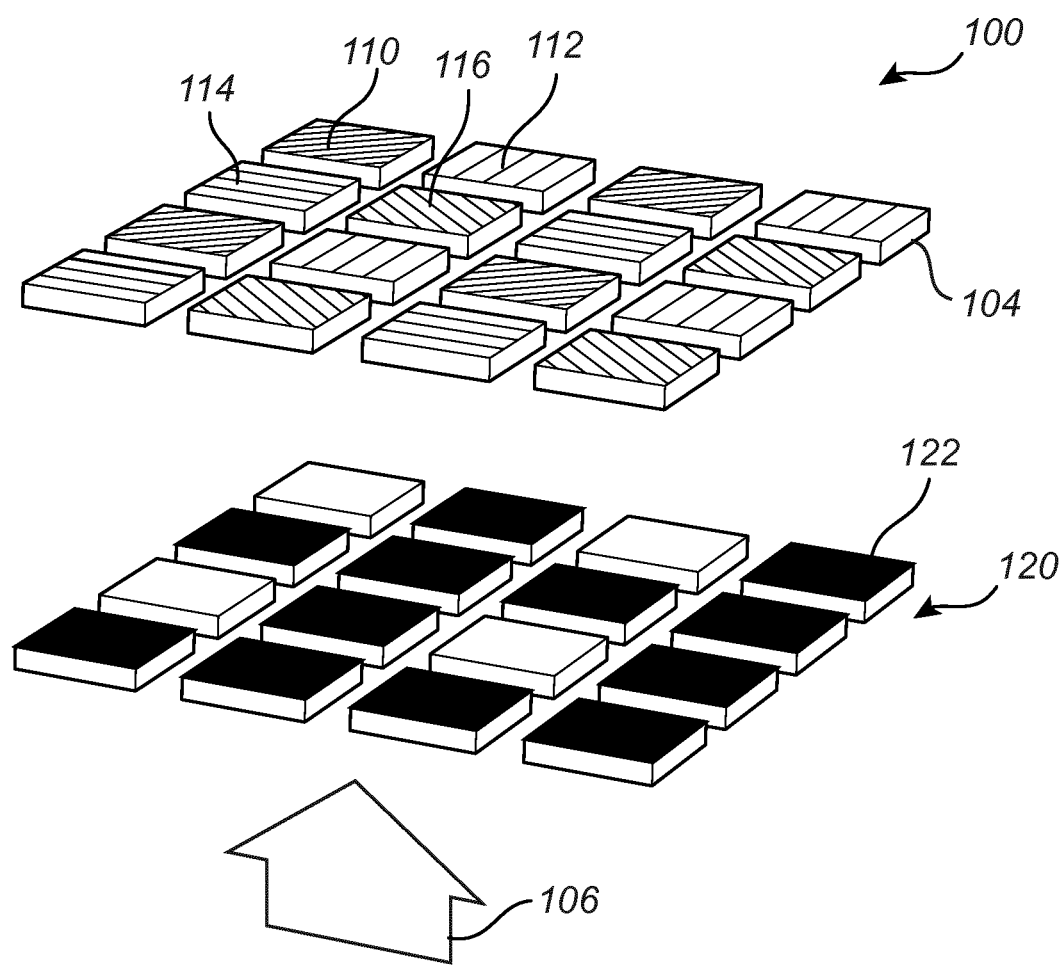

Depending on a projection geometry of the optical device 100, different arrangements for the array 102 of unit cells 104 and a shutter pattern 120 may be required, as illustrated in FIGS. 2a-b. FIG. 2a illustrates an optical device 100 which is configured to reflect an incident light beam 106 for forming the distribution of the three-dimensional light field, whereas FIG. 2b illustrates an optical device 100 which is configured to transmit an incident light beam 106 for forming the distribution of the three-dimensional light field.

In the illustrated embodiment of FIGS. 2a-b, a pixel pitch of 50 nm of individual unit cells 104 is indicated. With such a pixel pitch, 2×2 unit cells 104 would fit within a square with a 100 nm side. This implies that four subsets 110, 112, 114, 116 of unit cells 104 may be defined in the array 102 of unit cells 104 with each subset 110, 112, 114, 116 having an effective pitch of 100 nm. The unit cells 104 belonging to each subset 110, 112, 114, 116 are illustrated in FIGS. 2a-b by different hatchings of the unit cells 104.

One subset 110 may be active for forming the distribution of the three-dimensional light field. This is illustrated in FIGS. 2a-b by the light shutter structure 120 comprising white areas associated with the active subset 110, i.e. the light shutter structure 120 allows the incident light beam 106 to reach the unit cells 104 in the active subset 110. Further, the light shutter structure 120 comprises black areas associated with the inactive subsets 112, 114, 116, i.e. the light shutter structure 120 prevents the incident light beam 106 to reach the unit cells 104 in the inactive subsets 112, 114, 116.

In the embodiment of FIGS. 2a-b, 1 out of 4 pixels are simultaneously activated, and the optical device 100 is illustrated at a given point in time when the subset 110 is active. The unit cells 104 of the inactive subsets 112, 114, 116, are being written at that time to encode the distribution of the three-dimensional light field of next frame(s).

It should be realized that, although FIGS. 2a-b illustrate an optical device 100 comprising four subsets 110, 112, 114, 116, other number of subsets may be used in the array 102, such as two or three subsets.

In case of reflective geometry (as illustrated in FIG. 2a) and transmissive geometry (as illustrated in FIG. 2b) for the forming of distribution of the three-dimensional light field, the functionality of the shutter structure 120 should have a different nature. For both geometries, an open shutter structure 120 should transmit (part of) the incident light beam 106, while a closed shutter structure 120 should at least partially prevent transmitting of light.

In the reflective geometry of FIG. 2a, it is desired that the closed shutter does not reflect any of the incident light, which implies that an absorptive shutter structure 120 would work best. In the transmissive geometry of FIG. 2b, the shutter structure 120 could be reflective and/or absorptive in the closed state, since for both reflection and absorption the light shutter structure 120 will not create any interference with the distribution of the three-dimensional light field to be formed by the optical device 100.

It should also be noted that in the transmissive geometry of FIG. 2b, a position of the array 102 of unit cells 104 and the light shutter structure 120 could also be switched without changing any functionality of the device. That is, the light beam 106 may be incident on the array 102 of unit cells 104. Light transmitted from the array 102 of unit cells 104 may then be incident on the light shutter structure 120, whereby the light shutter structure 120 may select whether light is further transmitted for selecting whether a unit cell 104 is allowed to contribute to the forming of the distribution of the three-dimensional light field.

Thus, in one embodiment, the light shutter structure 120 is arranged in relation to the array 102 of unit cells 104, and the light shutter structure 120 is controllable for selecting whether incident light on the light shutter structure 120 reaches a unit cell 104 with which the light shutter structure 120 is associated for selecting whether the unit cell 104 is being inactive or being active.

In another embodiment, the light shutter structure 120 is arranged in relation to the array 102 of unit cells 104, and the light shutter structure 120 is controllable for selecting whether incident light on the light shutter structure 120 allows light being transmitted by a unit cell 104 to contribute to the forming of the distribution of the three-dimensional light field for selecting whether the unit cell 104 is being inactive or being active.

In the remainder of this disclosure, different implementations are illustrated for the reflective geometry, but it should be realized that, possibly with appropriate adjustments for the transmissive geometry, these implementations may also be used in the transmissive geometry.

The shuttering of light may be achieved in different architectures, which will be discussed below in relation to various embodiments. Two embodiments are illustrated in FIGS. 3a-b.

In its simplest implementation (illustrated in FIG. 3a), the array 102 of unit cells 104 and a pattern of the light shutter structure 120 have the same density and addressing. Such implementation could in some embodiments use identical components to provide a switchable condition of the optical property in the unit cell 104 and to provide a switching of the light shutter structure 120 to control whether the unit cell 104 is active or inactive.

In such implementation, the addressing of the light shutter structure 120 would be more simple, since a same operation is to be performed on all light shutters associated with a subset 110, 112, 114, 116.

Figure 3A:
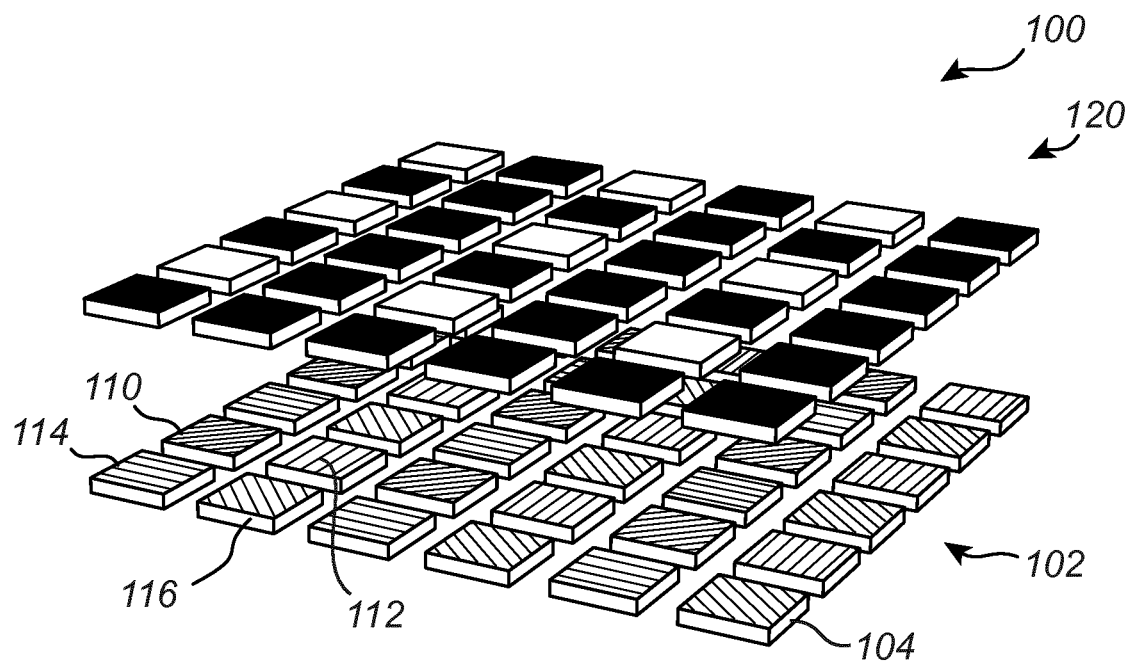
FIGS. 3a-b and 4a-d are schematic views illustrating embodiments of defining subsets of unit cells in an array of unit cell of an optical device.
Figure 3B:
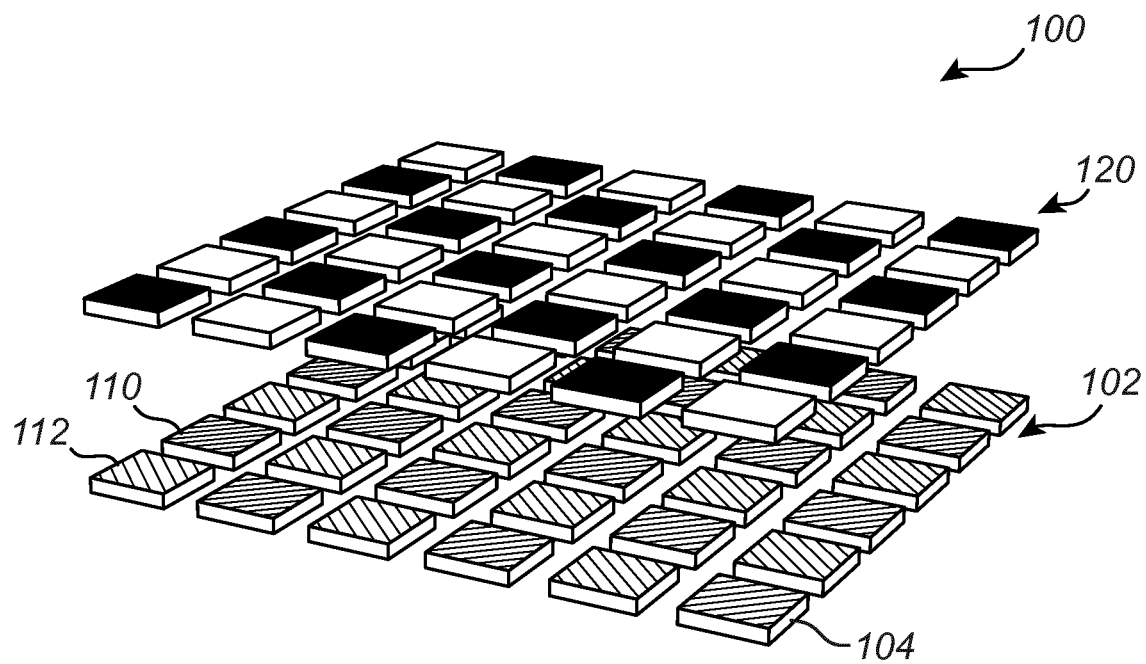

A variation on the implementation of the light shutter structure 120 in FIG. 3a is shown in FIG. 3b, where two subsets 110, 112 are defined such that 1 out of 2 unit cells 104 are active simultaneously. The subsets 110, 112 are arranged in a checkerboard pattern, in which the effective pitch of the subsets 110, 112 is only increased by a factor of $\sqrt{2}$ in relation to the pitch of unit cells 104 in the array 102. In this geometry, the light shutters 122 can be addressed by simple line electrodes, which simplifies the addressing of the light shutter structure 120 compared to the embodiment in FIG. 3a, where there would be a need for cross-point addressing.

Other implementations of light shutter structures 120 are illustrated in FIGS. 4a-d, where the effective pitch of the subsets 110, 112, 114, 116 is increased at least in one dimension (rows/columns), depending on the implementation.

Figure 4A:
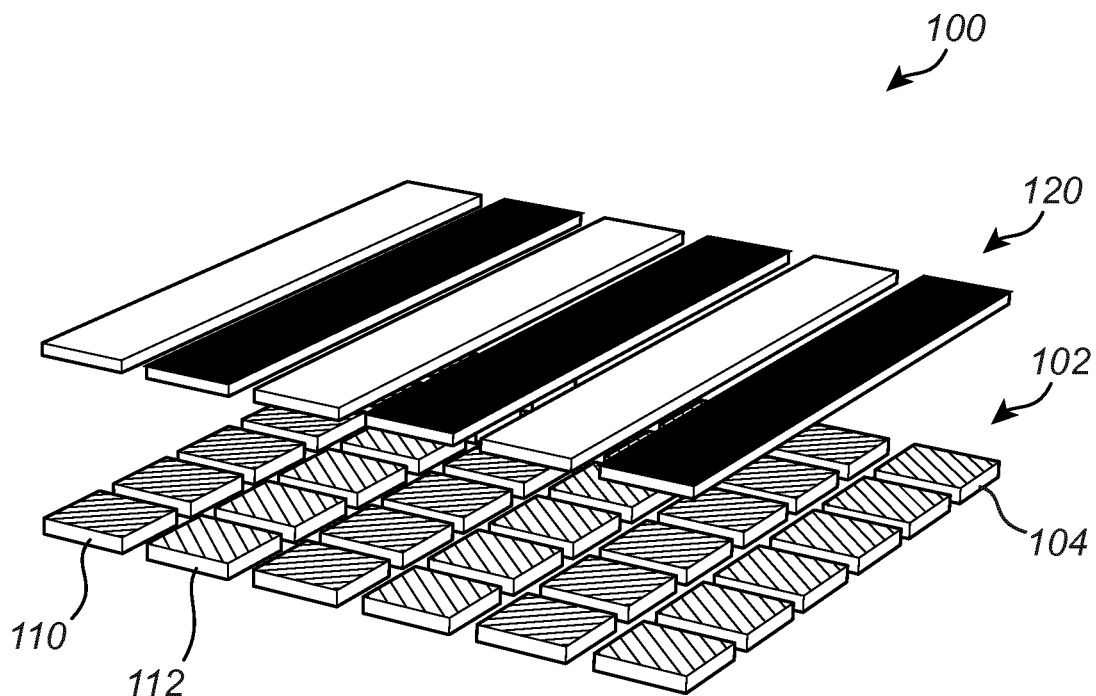

In the embodiment illustrated in FIG. 4a, each column of unit cells 104 in the array 102 share an elongated shutter 122. Such a pattern allows to control the shutters 122 by means of simple line electrodes. Variations where the shutters 122 cover multiple columns would benefit from the same simple addressing with less stringent limitations to the contact electrodes.

Figure 4B:
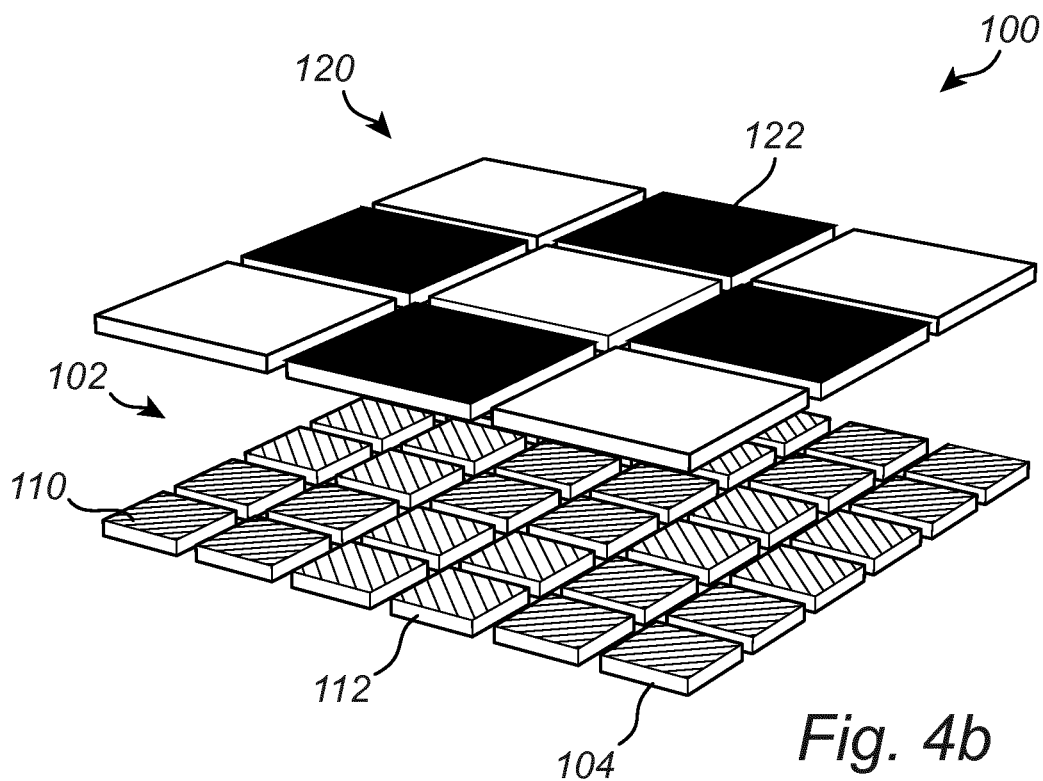
Figure 4C:
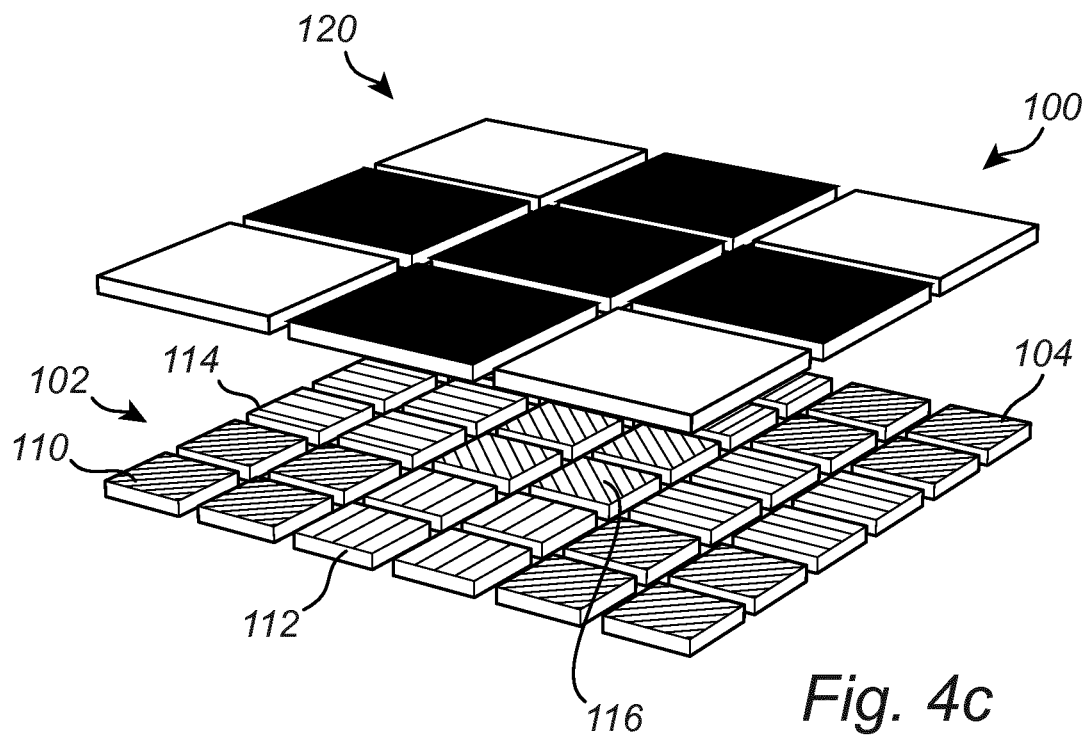

In the embodiments illustrated in FIGS. 4b and 4c, there are provided shutters 122 that cover clusters of 2×2 unit cells 104. The embodiment in FIG. 4b defines two subsets 110, 112 of the array 102, wherein 1 out of 2 clusters of unit cells 104 are simultaneously active. The embodiment in FIG. 4c defines four subsets 110, 112, 114, 116, wherein 1 out of 4 clusters of unit cells 104 are simultaneously active.

The embodiment in FIG. 4b again allows a very simple contacting of the light shutter structure 120 by means of line electrodes. In the embodiment in FIG. 4c, a main advantage is a reduced density in the electrodes required for controlling the light shutter structure 120 (compared to the embodiment in FIG. 3a).

It should be realized that variations on the embodiments illustrated in FIGS. 4a-c, where the shutters 122 cover N×M rows and columns would allow reducing complexity of the control electrodes for the light shutter structure 120, while still maintaining a small pitch of unit cells 104 in the active subset 110 that forms the distribution of the three-dimensional light field.

The segmentation or arrangement of the unit cells 104 in the active subset 110 will impact calculation of the condition of the optical property to be set for the respective unit cells 104 in order to form the desired distribution of the three-dimensional light field. Also, the segmentation or arrangement of the unit cells 104 in the active subset 110 may affect the image quality that can be attained. Therefore, there may be a trade-off to be made between the image quality and the degree of segmentation of the unit cells 104 in the subsets 110, 112, 114, 116, both for finding a most practical implementation of the electrodes for controlling the light shutter structure 120 and a most efficient calculation of the desired distribution of the three-dimensional light field.

Figure 4D:
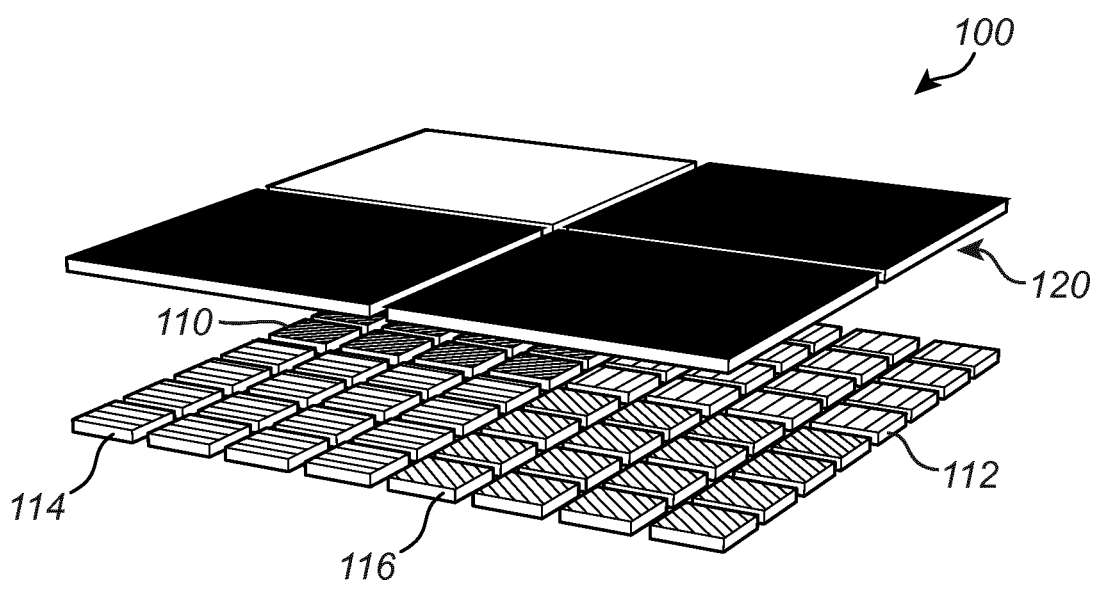

In FIG. 4d, an embodiment is illustrated where the segmentation of the subsets 110, 112, 114, 116 is done side-by-side. Each subset 110, 112, 114, 116 may be formed in a separate chip, wherein the chips may be arranged in close relation to each other. Thus, each subset 110, 112, 114, 116 may form a sub-array of unit cells 104. In the embodiment in FIG. 4d, an array of 2×2 sub-arrays is used for sequential forming of different distributions of the three-dimensional light field.

The embodiments above generally describe a light shutter structure 120 which may be applied for a single operational wavelength, i.e. that a single light beam 106 of a single wavelength is incident on the optical device 100. However, in many applications, such as for an actual display of holographic video, there may be a need for use of multiple colors.

As such, the segmentation schemes illustrated above can be extended for multiple color operation. Multiple color operation may call for adding color filters to the optical device 100. The color filters 130 may for instance be integrated on a substrate on which the array 102 of unit cells 104 is formed. A color filter 130 may be arranged to be associated with a single unit cell 104, such that each unit cell 104 may be associated with a respective color filter for controlling an operational wavelength that will be received by the unit cell 104.

Additionally or alternatively, the illumination can be masked to selectively illuminate specific areas of the array 102 of unit cells 104 with a specific color.

Again, choices made for segmentation of the subsets 110, 112, 114, 116 in combination with color filters 130 could have an extra impact on an algorithm for calculation of the condition of the optical property to be set for the respective unit cells 104 in order to form the desired distribution of the three-dimensional light field for different colors. To this extent, it is likely that larger segmentation areas covered by an individual shutter 122 would have less impact on the calculation and again an optimum may be sought in terms of the segmentation that is most practical in terms of implementation both with respect to the algorithm complexity and the required image quality.

Figure 5A:
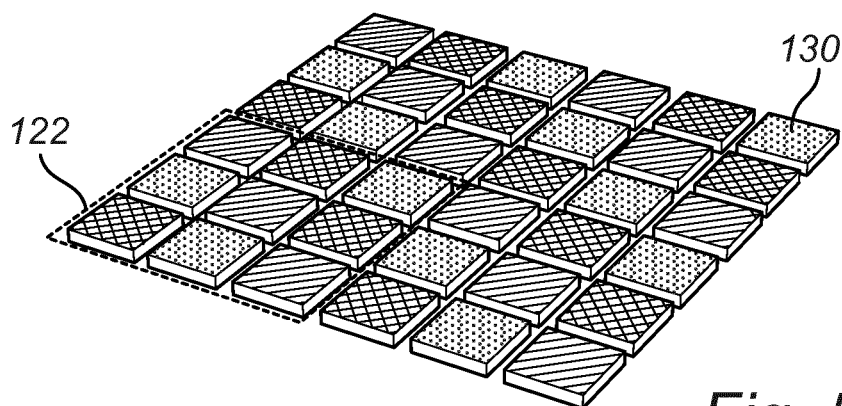
FIGS. 5a-b are schematic views illustrating color filters used with an optical device.
Figure 5B:
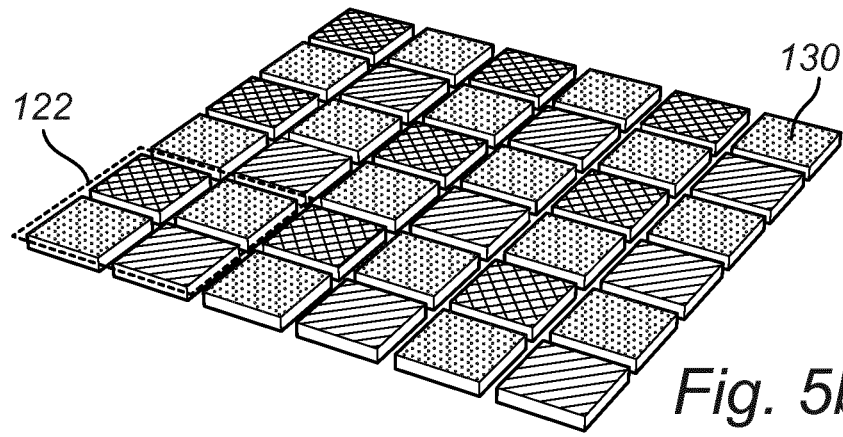

Two embodiments of possible layouts of color filters 130 associated with the array 102 of unit cells 104 are illustrated in FIGS. 5a-b. The color filters 130 are illustrated in FIGS. 5a-b using a lined hatch pattern to illustrate a color filter 130 allowing blue light to be transmitted, a dotted hatch pattern to illustrate a color filter 130 allowing green light to be transmitted, and a cross-line hatch pattern to illustrate a color filter 130 allowing red light to be transmitted.

The embodiment in FIG. 5a has defined the same number of unit cells 104 for the three target colors red, green and blue, while the embodiment in FIG. 5b illustrates use of the YUV color encoding system, which is commonly used in display and camera applications. In the embodiment in FIG. 5b, there are twice as many unit cells 104 for green light compared to red and blue, while the arrangement of the color filters 130 still appear in a periodic array. The periodicity of red and blue unit cells 104 is twice the individual pitch of unit cells 104 in the array 102, while the periodicity of the green unit cells 104 is $\sqrt{2}$ times the individual pitch of unit cells 104 in the array 102. For applications of displaying holographic images, such a tiling could be used to compensate for different diffraction efficiencies of the switchable unit cells 104 that target the different colors.

For different tiling schemes, different light shutter structures 120 would be required in order to obtain the desired distribution of the three-dimensional light field and the calculation algorithm will need to account for the segmentation when calculating the condition of the optical property to be set for the respective unit cells 104 in order to form the desired distribution of the three-dimensional light field.

It is easy to realize that in implementations of FIG. 5a and FIG. 5b, shutters 122 covering (multiples of) 2×2 and 3×3 arrays (examples indicated by dashed lines in FIGS. 5a-b) result in identical geometries of unit cells 104 associated with the respective colors below each shutter 122.

In a practical implementation, a tiling as illustrated in FIG. 5b may result in a simplified calculation for calculating the condition of the optical property to be set for the respective unit cells 104 compared to the tiling illustrated in FIG. 5a, as in the case of FIG. 5b, the periodicity of unit cells 104 associated with a specific color is fixed and the individual unit cells 104 are on a square lattice.

In the embodiment illustrated in FIG. 5b, red and blue unit cells 104 are arranged on a square grid with 2 times the period of individual unit cells 104, while the green unit cells are on a 45 degree rotated square grid with $\sqrt{2}$ times the period of individual unit cells 104.

In other embodiments, it could be useful to group clusters of N×M unit cells 104 targeting the same color and arranged in similar patterns as shown in FIGS. 5a-b, but where each "pixel" would be a "macro-pixel" consisting of an array of "micro-pixels" (individual unit cells 104) targeting a specific wavelength. Such a macro-pixel could then be equipped with a single color filter 130, while the light shutters 122 could again be associated with multiple macro-pixels operating for different colors.

The color filters 130 may be simple dielectric multilayer bandpass filters that can either be integrated into a substrate on which the array 102 of unit cells 104 is formed. Alternatively, the color filters 130 with the desired patterning may be placed in front of a light source or anywhere in a light path between the light source and the optical device 100. In such case, it will be important to have good alignment control to ensure that the color filters 130 are associated with intended unit cells 104.

Many different types of light shutter structures 120 could be used, depending on the specific architecture used.

In a simple case, the light shutter structure 120 used is implemented at unit cell level and a same type of switchable component is used both in the unit cell layer and the light shutter layer, irrespective of the operational mechanism. In such implementation, a good on/off ratio in terms of reflected/transmitted intensity from the light shutter 122 may be needed.

The use of the same type of switchable component for the light shutter structure 120 and the unit cells 104 would work well in the transmissive geometry (FIG. 2b), where an open shutter 122 would be in the same state as a unit cell 104 in an "on"-state (i.e. setting the condition of the optical property to provide a high degree of transmission of light), while a closed shutter 122 would be in the same state as a unit cell 104 in an "off"-state (i.e. setting the condition of the optical property to substantially prevent transmission of light). For such implementation, the transmitted intensity in the on/open state may need to be very large in order to have sufficient light intensity out of the optical device 100, after light has passed through the unit cell 104 and the light shutter 122.

In the reflective geometry (FIG. 2a), light passes the shutter 122 twice, when incident on the shutter 122 from the light source and passed to the unit cell 104 and when reflected by the unit cell 104 and passed by the shutter 122 for forming the distribution of the three-dimensional light field above the shutter 122. Thus, the shutter 122 should again be very transmissive in the open state, while being highly absorptive in the closed state.

In the open state, the main modulation in the light intensity should come from the unit cell 104 with which the light shutter 122 is associated. In the closed state, the light should be absorbed as to not generate reflections that would interfere with the three-dimensional light field being formed by neighboring active unit cells 104. For the unit cells 104 on the other hand, a large reflection is desired in the "on"-state, while in the "off"-state the light could either be absorbed or transmitted towards the substrate on which the unit cells 104 are formed.

Given that the periodicity of the unit cells 104 in a subset 110, 112, 114, 116 may advantageously be well below the operational wavelength, the shutters 122 may be arranged to be associated with a plurality of unit cells 104 in order to avoid a need of the individual shutters 122 to be of a very small size. Such arrangement of the light shutters 122 may at least be used for operational wavelengths in the visible or NIR spectral region (for longer wavelengths, size of unit cells 104 may be larger and the light shutters 122 may be more easily individually formed for respective unit cells 104). Therefore, the shutters 122 can be larger than the unit cells 104 and be associated with a plurality of unit cells 104.

Determining an appropriate dimension for a shutter 122 may involve taking into account an impact of the light shutter 122 on the calculation algorithm for generating a desired distribution of the three-dimensional light field and taking into account practical considerations for the implementation for the shutter 122 based on a shutter type that is selected.

Below a plurality of different manners of implementing the light shutter structure will be described.

As described above, PCMs may be useful in controlling a condition of an optical property of a unit cell 104. For a transmissive geometry, a similar design may be used as a light shutter 122, at least when the transmitted intensity is sufficiently high.

Thus, the light shutter 122 may comprise a PCM layer, which may be switched between a first state and a second state, wherein switching of the PCM between the first state and the second state is configured to switch the light shutter 122 between an open state and a closed state.

The PCM may be configured to switch between a crystalline state and an amorphous state. However, it should be realized that the first and second states may be other configurations of states of the PCM. For instance, the PCM may be configured to switch between two different crystalline states.

The light shutter 122 may comprise a layer of PCM, which may be combined with other materials, e.g. in a stack of layers of materials, such that the combination of materials may define an open or a closed state of the light shutter 122. The switching of a state of the PCM may then affect the optical property of, for instance, the stack of layers in the light shutter 122, such that a state of the light shutter 122 may be controlled by a state of the PCM.

As outlined above, for reflection-based geometries the functionality of the light shutter 122 and the unit cell 104 would be different. Thus, if the light shutter 122 would be implemented using a PCM in a reflection-based geometry, a design of the light shutter 122 using the PCM (e.g. a stack of layers including the PCM layer) would have to be different from a design of the unit cell 104 using the PCM.

According to another embodiment, the light shutter structure 120 may use liquid crystals.

Operation of liquid crystals relies on rotating a linear polarization of light passing through the liquid crystal, which is positioned between two linear polarizers that are rotated 90° with respect to each other. In the open state of the light shutter 122 using a liquid crystal, polarization of light is rotated by 90° in the liquid crystal and therefore light is allowed to be transmitted through the linear polarizers of the light shutter 122. In the closed state of the light shutter 122, light maintains the initial polarization when propagated in the liquid crystal and is therefore not allowed to be transmitted through the linear polarizers of the light shutter 122.

While technology using liquid crystals is very mature, presently a smallest pixel size that can be realized with liquid crystals is limited to a few microns in size. The rotation of the polarization is achieved by elongated molecules that form a spiral arrangement and that need to physically be rotated and have sufficient interaction with the light to perform well. This implies that for the array 102 of unit cells 104 with sub-wavelength pixel pitch, light shutters 122 using liquid crystals could be applied only on larger blocks of pixels or "macro"-pixels.

According to another embodiment, the light shutter structure 120 may use an electro-optic effect.

An electro-optic effect is a change in the optical properties of a material in response to an electric field that varies slowly compared with the frequency of light. The most common changes are a change in the material absorption or in the refractive index or permittivity of the material as function of an external electric field. Both mechanisms can be used to create light shutters 122, relying on a variety of underlying effects.

For instance, light shutters 122 may be implements using materials that exhibit a strong electro-optic effect in changing the refractive index using the Pockels effect (linear electro-optic coefficient) or Kerr effect (quadratic electro-optic coefficient). The Pockels effect can be observed in certain crystalline materials that lack inversion symmetry and is in general much stronger than the Kerr effect. The Pockels effect has been widely studied for electro-optic modulators which can be used to change both phase and amplitude of an electromagnetic wave.

The light shutter 122 may thus be switched between an open and a closed state based on applying a local electric field to the light shutter 122.

According to another embodiment, the light shutter structure 120 may use a magneto-optic effect.

Figure 6:
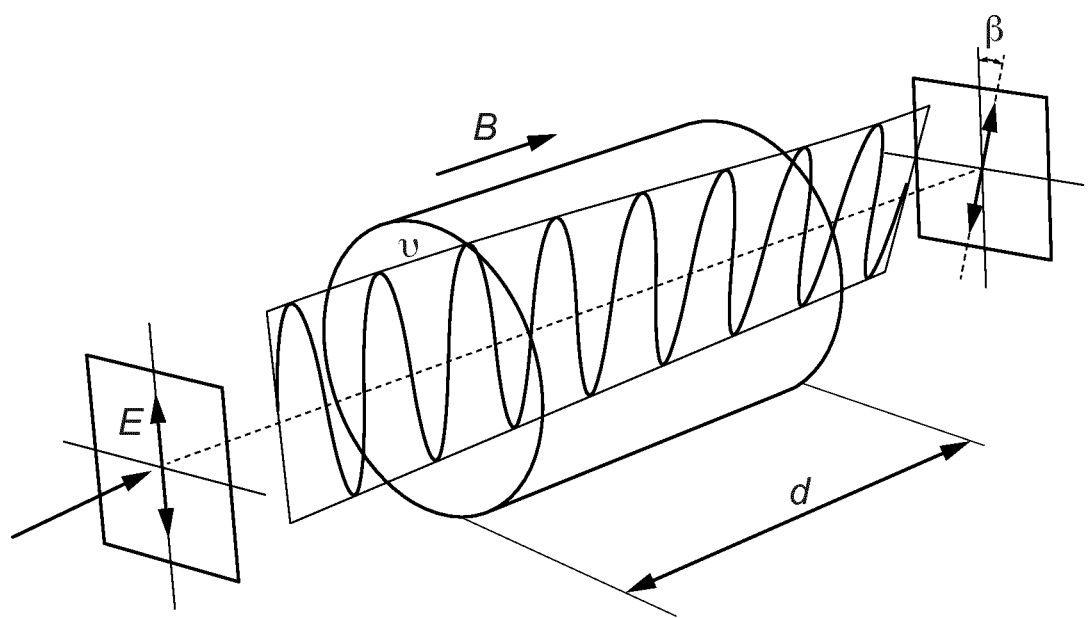
FIG. 6 is a schematic view illustrating a principle of a Faraday rotator.

A magneto-optic effect is a change in the optical properties of a material in response to its magnetization. When a material is magnetized, the time-reversal symmetry is broken, which results in off-diagonal terms in a permittivity tensor of the material. When light interacts with such materials, upon transmission or reflection from the material, the polarization state of light is altered, resulting in a modulation of the intensity and phase of light. In a transmission geometry this effect is called the Faraday effect, while in reflection it is called the Magneto-Optical Kerr effect (MOKE). The most common use of these effects is in optical isolators, where a so-called Faraday rotator is used in combination with two linear polarizers. Upon propagating with linearly polarized light through a Faraday rotator, the polarization of light is rotated with an angle that depends on the magnetization of the material, as illustrated in FIG. 6.

In a typical optical isolator, the length d is chosen such that the rotation angle $\beta$ reaches 45°, such that light with vertical polarization allowed to be passed by a first polarizer on an input side will pass through a second polarizer at an output side, wherein the second polarizer is rotated 45° with respect to the first polarizer. If light propagates in an opposite direction from the output side to the input side, the Faraday rotator will give the light a horizontal polarization at the input side, and hence no light will be transmitted through the first polarizer. Upon switching the magnetization of the Faraday rotator, the rotation direction will be reversed, which means that such a device can operate as an optical shutter.

However, typical rotation values for state-of-the-art garnet-based Faraday rotators is of the order of 0.1°/µm, which means that the propagation length should be fairly long. Thus, a light shutter 122 based on a Faraday rotator may be relatively large. However, it may not be necessary to use a full 45° rotation in the Faraday rotator, so by working with different polarizer angles it may still be possible to realize more compact light shutters 122, but with a penalty in transmitted power intensity.

The light shutter 122 using a magneto-optic effect may thus be switched between an open and a closed state based on applying a local magnetic field to the light shutter 122.

According to another embodiment, the light shutter structure 120 may use a microelectromechanical system (MEMS) or nano-microelectromechanical system (NEMS) based component.

MEMS-based components have been used for different types of display devices. Most work is based on micromirror arrays that are mainly (but not exclusively) used for reflective projection displays, but also transmissive displays with LED backlighting have been realized with shutter sizes as small as 10 μm. For a transmissive geometry of the MEMS-based component, using MEMS shutters is likely to be very complex, but micro-mirrors could be used as an effective way for illuminating selected parts of the array 102 of unit cells 104, as illustrated in FIG. 7.

Figure 7:
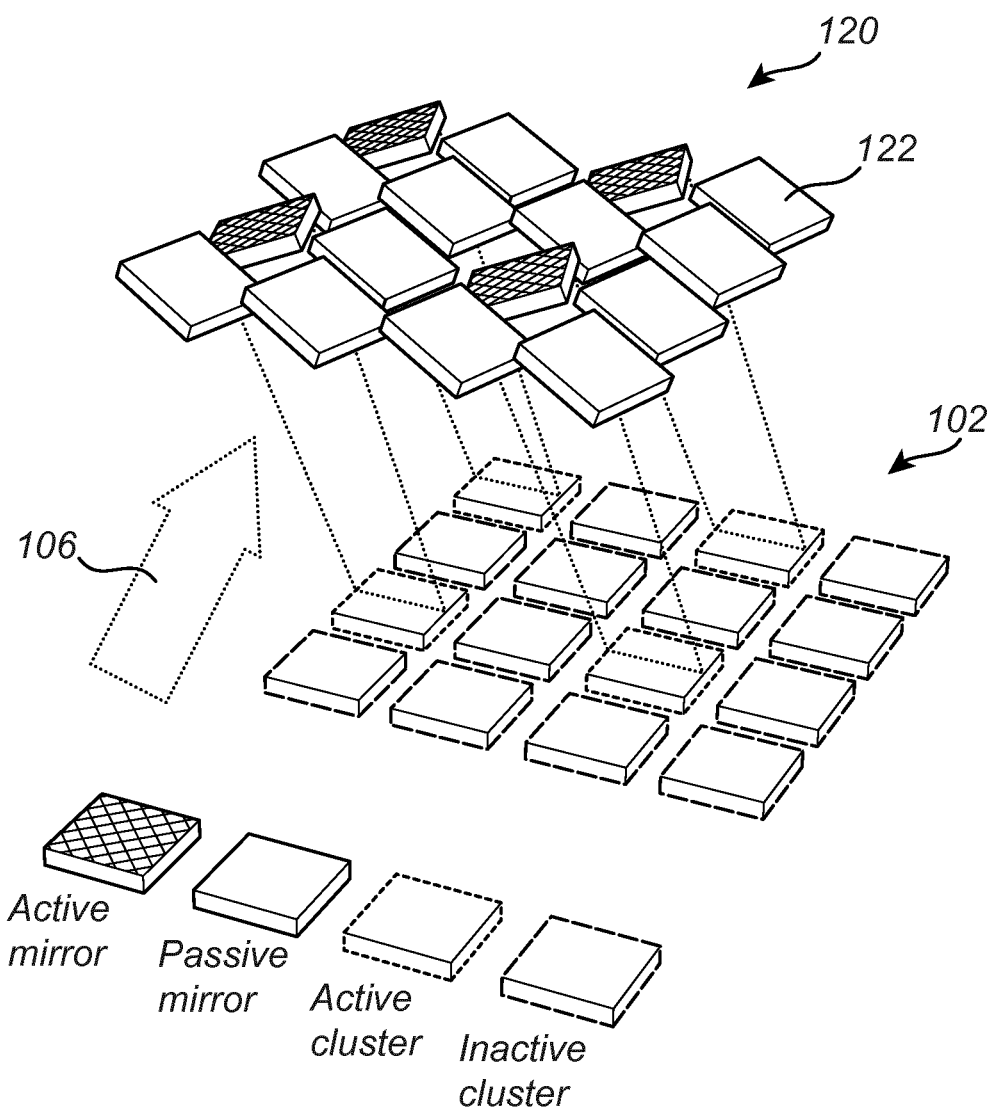
FIGS. 7-8 are schematic views illustrating light shutter structures of an optical device, where the light shutter structures are implemented using a MEMS based micromirror system.

The configuration shown in FIG. 7 would work both for reflective geometry and transmissive geometry of the optical device 100. The MEMS-based light shutter structure 120 comprises an array of micro-mirrors 122, wherein each micro-mirror may be associated with one or more unit cells 104 in the array 102.

Such a MEMS based mirror system may be fabricated with dimensions down to a few μm, so micro-mirrors controlled by a MEMS-based structure may perform a light shuttering that allows to define subsets 110, 112, 114, 116 in the array 102. The MEMS based mirror system may not be able to select a single unit cell 104 to receive light. Rather, the pixels indicated in FIG. 7 each represent a cluster of unit cells 104 and not individual unit cells 104. For instance, for a mirror size of 5 μm and a pitch of individual unit cells 104 of 50 nm, a light shutter structure 120 using MEMS based mirror system would be segmenting light into macro-pixels that contain 100×100 individual unit cells 104.

Figure 8:
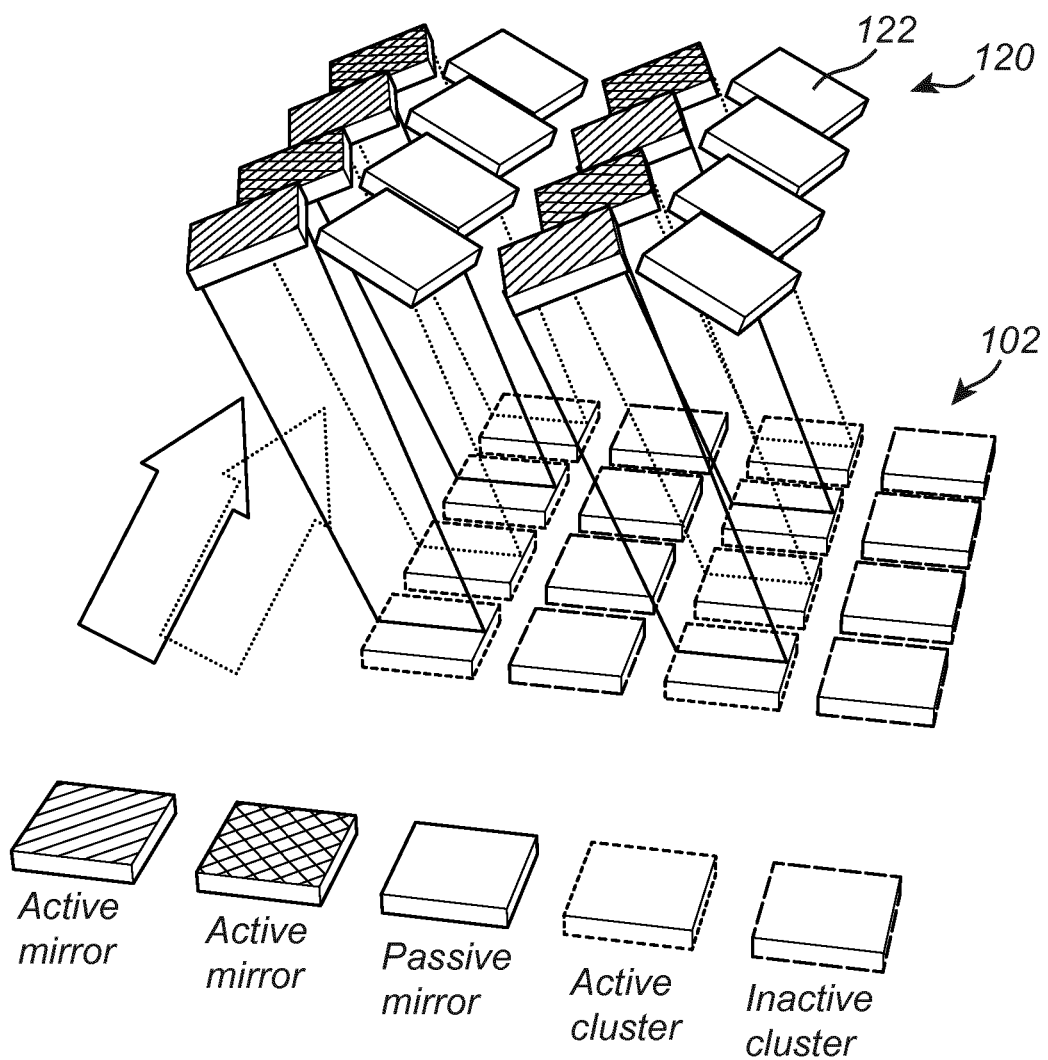

The MEMS based mirror system would also be possible to multiplex to multiple colors by equipping each mirror 122 with a bandpass filter that only transmits the target wavelength of the macro-pixel it is illuminating, as illustrated in FIG. 8.

The light shutter 122 using a MEMS based mirror system may be switched between an open and a closed state based on controlling a microelectromechanical activator associated with the micro-mirror 122 for setting the micro-mirror in a position to reflect light towards the array 102 of unit cells 104 or direct light into another direction so that it will not reach the array 102.

According to another embodiment, the light shutter structure 120 may use passive light polarizers.

A simple implementation to define two subsets 110, 112 of unit cells 104 (for a single operational wavelength) would be to equip each subset 110, 112 with passive (wire-grid) linear polarizers, wherein the polarizers of the respective subsets 110, 112 are oriented orthogonal with respect to each other.

A control whether a subset 110, 112 will be active may then be performed by changing the linear polarization state of the incident light beam 106. This could be achieved in many different ways, for example by rotating a linear polarizer, photo-elastic modulators (PEMs), liquid crystals or Faraday rotators, which may be associated with the light source or with the optical device 100.

According to another embodiment, the light shutter structure 120 may use active light polarizers.

An architecture with switchable, PCM-based (wire-grid) polarizers could be used to select whether a subset 110, 112 is active or inactive. In such implementation, the periodicity and duty cycle of the wire-grid polarizer should be selected as to transmit a lot of light in one state of the PCM and absorb or reflect a lot of light in the other state of the PCM.

In such configuration, a subset of unit cells 104 targeting a first color can already be switched on or off using a single linear polarization state for the illumination. A second subset of unit cells 104 targeting another wavelength could then be equipped with switchable polarizers that are rotated 90° with respect to the polarizers of the first subset. Further, the incident light beam of the second color may also have a linear polarization which is rotated with 90° with respect to the first color.

According to another embodiment, the light shutter structure 120 may, in an implementation with individual light shutters 122 being associated with fairly large clusters of unit cells 104 or being associated with sub-arrays of the unit cells 104, use macroscopic mechanical shutters, while designing the mechanical shutters to be switched fast enough to maintain a desired frame rate.

When the unit cells 104 in the array 102 are made polarization-dependent for providing an optical property of the unit cell 104 (for example to function with two different wavelengths that are illuminating the array 102 with orthogonal linear polarization states), all of the above mentioned light shutter structures 120 that are polarization-based could be used to obtain additional functionalities.

Figure 9:
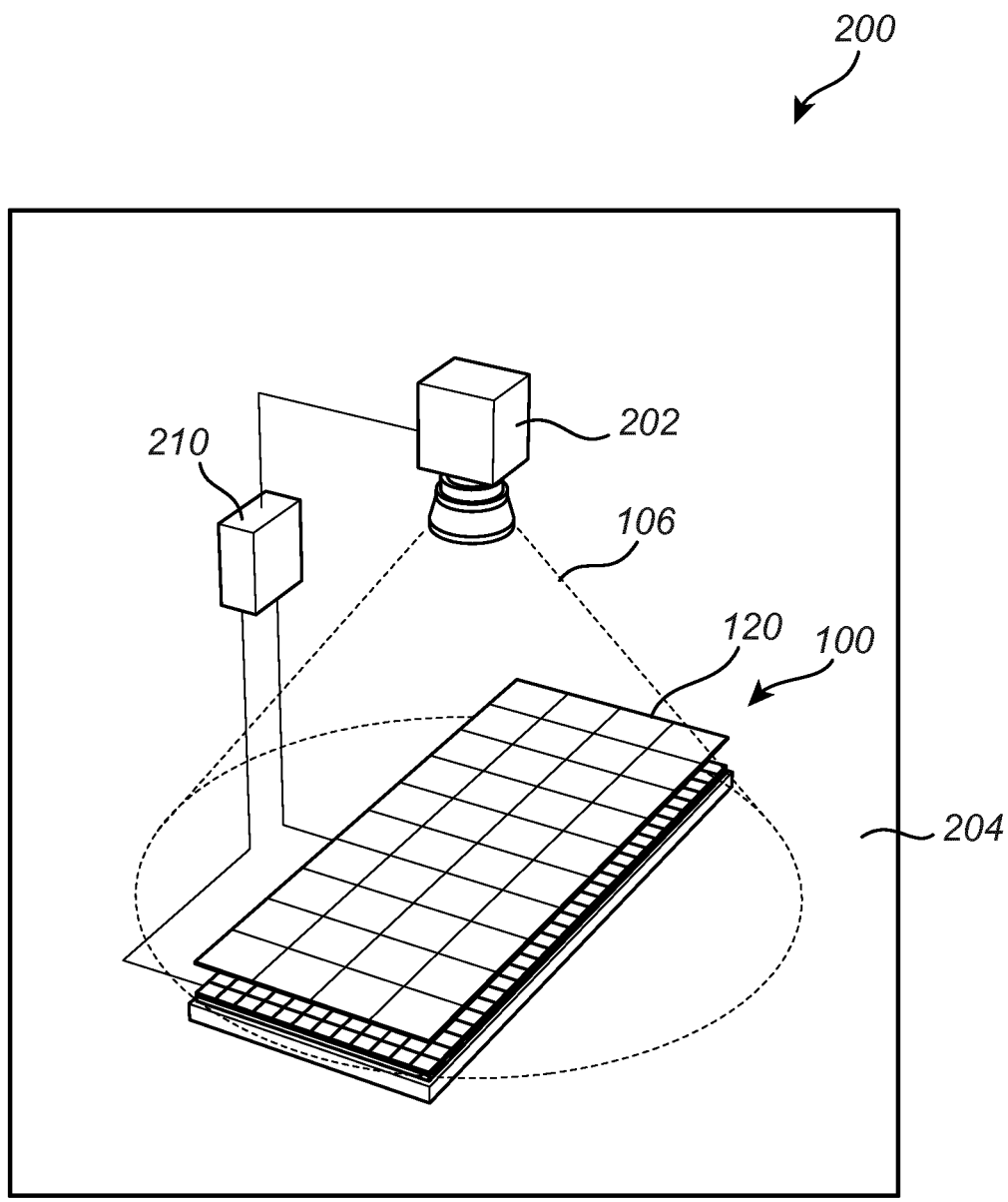
FIG. 9 is a schematic view of a system according to an embodiment.

Referring now to FIG. 9, a system 200 for forming a distribution of a three-dimensional light field will be discussed.

The system 200 may comprise the optical device 100 according to any of the above described embodiments. The system 200 may further comprise one or more light sources 202 for providing illumination light of the operational wavelength(s).

Further, the system 200 may comprise optical component(s) which may be arranged in a path between the light sources 202 and the optical device 100 for ensuring a desired illumination of the array 102 of unit cells 104.

As mentioned for various embodiments above, the light shutter structure 120 may be integrated with a substrate on which the array 102 of unit cells 104 is formed. Alternatively, the light shutter structure 120 may be separately arranged e.g. in the light path between the light sources 202 and the optical device 100 or mounted in relation to the light sources 202.

The system 200 may be implemented in a housing 204 for providing a well-controlled mounting of the light sources 202, the light shutter structure 120 and the optical device 100 in relation to each other.

The system 200 may further comprise a controller 210, which may control one or more functions of the system 200. A controller 210 may be integrated on a substrate on which the array 102 of unit cells 104 is formed and may provide control of when control signals are to be provided to unit cells 104 for switching a condition of an optical property of the unit cells 104. Further, the controller 210 may control the light shutter structure 120 for switching a light shutter 122 between an open and a closed state.

The controller 210 may receive information of a desired holographic image to be displayed and may execute an algorithm for calculating of the condition of the optical property to be set for the respective unit cells 104 in order to form the desired distribution of the three-dimensional light field. Alternatively, the controller 210 may receive information of the conditions of the optical property to be set for the unit cells 104 from an external unit, which may execute the algorithm.

The controller 210 may also control the light sources 202 for setting a polarization of the light sources 202 and synchronizing the polarization of incident light beam 106 on the optical device 100 with a timing of which subset 110, 112 of unit cells 104 that is to be active.

It should be realized that the controller 210 may be implemented as one or more processing units, such as a central processing unit (CPU), which may execute the instructions of one or more computer programs in order to implement functionality of the system 200.

The controller 210 may alternatively be implemented as firmware arranged e.g. in an embedded system, or as a specifically designed processing unit, such as an Application-Specific Integrated Circuit (ASIC) or a Field-Programmable Gate Array (FPGA).

Figure 10:
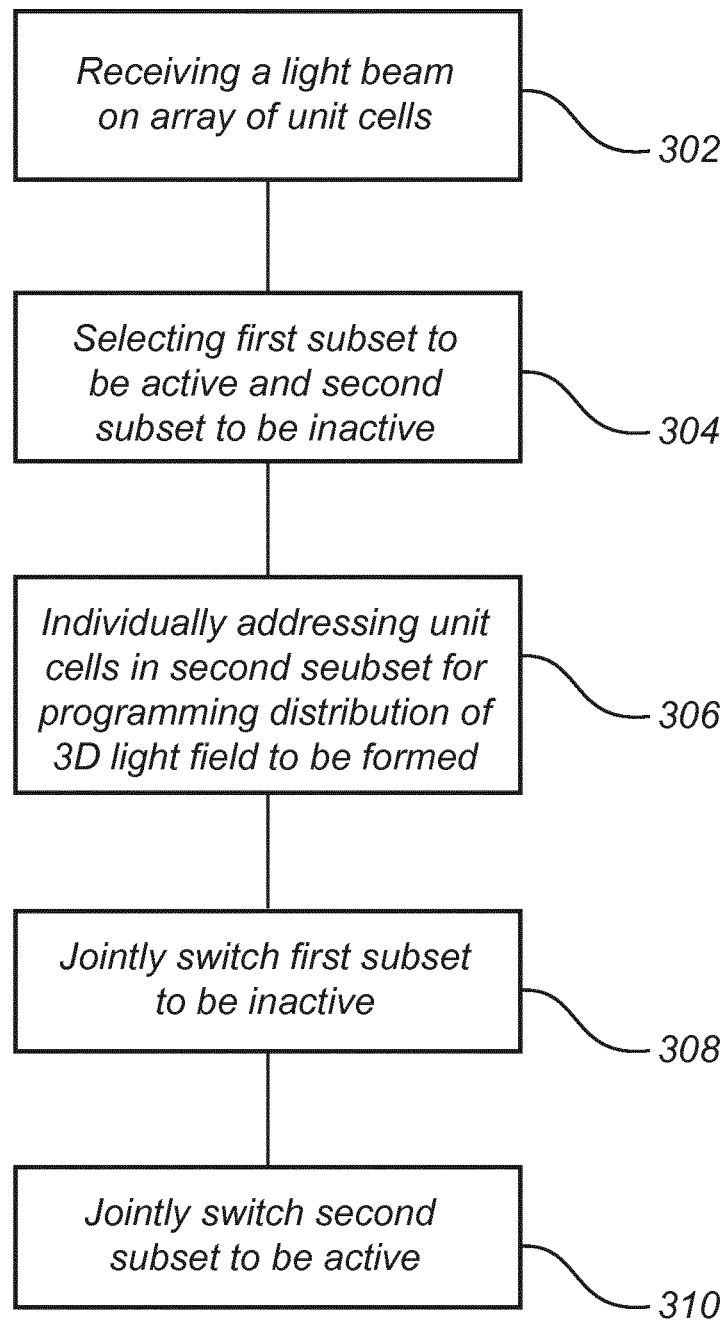
FIG. 10 is a flowchart illustrating a method according to an embodiment.

Referring now to FIG. 10, a method for forming a distribution of a three-dimensional light field will be discussed.

The method may comprise receiving 302 a light beam incident on an array of unit cells. The method further comprises selecting 304 a first subset of unit cells to be active and a second subset of unit cells to be inactive.

The unit cells of the active subset may thus together define a distribution of a three-dimensional light field formed by the unit cells receiving the incident light beam.

The method further comprises individually addressing 306 the unit cells in the second subset of unit cells, while the unit cells in the second subset are inactive, in order to control the optical property of the unit cells to one of at least a first condition of the optical property and a second condition of the optical property. By means of the addressing of the unit cells in the second subset, the second subset of unit cells is programmed for forming a distribution of the three-dimensional light field, which will be formed when the subset is switched to being active.

The method further comprises jointly switching 308 the first subset of unit cells to be inactive, such that the unit cells of the first subset no longer contribute to the distribution of the three-dimensional light field formed by the optical device.

The method further comprises jointly switching 310 the second subset of unit cells to be active. Thus, the optical device will, after switching the second subset to be active, form the distribution of the three-dimensional light field that has been programmed in the second subset of unit cells while the subset was inactive.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An optical device for forming a distribution of a three-dimensional light field, said optical device comprising:
an array of unit cells, wherein a unit cell in the array of unit cells is individually addressable for controlling an optical property of the unit cell, wherein addressing of the unit cell is configured to switch the optical property of the unit cell between a first condition of the optical property and a second condition of the optical property,
wherein the unit cells in the array of unit cells are configured to be selectively active or inactive and wherein the array of unit cells comprise at least a first subset of unit cells and a second subset of unit cells, wherein the first subset and the second subset are disjoint, and wherein the unit cells in a subset of unit cells are configured to be jointly switched from being inactive unit cells to being active unit cells,
wherein the active unit cells are configured to interact with an incident light beam and cooperate in forming the distribution of the three-dimensional light field, and
wherein the optical device is configured to address inactive unit cells for switching the optical property of unit cells while maintaining the addressed inactive unit cells inactive.

2. The optical device according to claim 1, wherein the unit cells of the first subset are arranged interleaved with the unit cells of the second subset in the array of unit cells.

3. The optical device according to claim 1, wherein the first subset of unit cells forms a first sub-array of unit cells and the second subset of unit cells forms a second sub-array of unit cells and wherein the first sub-array and the second sub-array are arranged adjacent to each other on a common substrate.

4. The optical device according to claim 1, wherein each subset of unit cells comprise first unit cells configured to interact with a first wavelength of light and second unit cells configured to interact with a second wavelength of light different from the first wavelength of light.

5. The optical device according to claim 1, further comprising a light shutter structure arranged in relation to the array of unit cells, wherein the light shutter structure is controllable for selecting whether incident light on the light shutter structure reaches a unit cell with which the light shutter structure is associated for selecting whether the unit cell is being inactive or being active.

6. The optical device according to claim 5, wherein the light shutter structure comprises a first light shutter which is shared by the first subset of unit cells and a second light shutter which is shared by the second subset of unit cells.

7. The optical device according to claim 5, wherein the light shutter structure comprises an array of light shutter units, wherein each light shutter unit is associated with a single unit cell, and wherein the light shutter units associated with the first subset are configured to be jointly controlled for switching the unit cells in the first subset from being inactive to being active.

8. The optical device according to claim 5, wherein the optical device comprises a control unit providing control signals to the light shutter structure, wherein a control signal is configured to control whether incident light on the light shutter structure reaches a unit cell with which the light shutter structure is associated based on changing a state of a phase-change material, changing a state of a liquid crystal for controlling light passing through polarization filters, inducing an electro-optical effect, inducing a magneto-optical effect, changing a polarization of light being transmitted by a polarization filter, activating a movement of an actuator in a microelectromechanical system, or activating a macroscopic mechanical shutter.

9. The optical device according to claim 1, wherein the optical device comprises a set of passive polarization filters arranged in relation to the array of unit cells, wherein the first subset of unit cells is associated with a first polarization filter configured to transmit light of a first polarization, and wherein the second subset of unit cells is associated with a second polarization filter configured to transmit light of a second polarization different from the first polarization.

10. The optical device according to claim 1, wherein the unit cells comprise a phase-change material, which may be switched between a first state and a second state, wherein switching of the phase-change material between the first state and the second state is configured to switch the optical property of the unit cell between a first condition of the optical property and a second condition of the optical property.

11. The optical device according to claim 1, wherein the active unit cells are configured to cooperate in reflecting an incident light beam for forming the distribution of the three-dimensional light field.

12. The optical device according to claim 1, wherein the active unit cells are configured to cooperate in transmitting an incident light beam for forming the distribution of the three-dimensional light field.

13. A system for forming a distribution of a three-dimensional light field, said system comprising:
   the optical device according to claim 1; and
   a light source configured to emit a light beam to be incident on the array of unit cells.

14. The system according to claim 13, further comprising a controller for controlling a polarization of light emitted by the light source.

15. A method for forming a distribution of a three-dimensional light field, said method comprising:
   receiving a light beam incident on an array of unit cells;
   selecting a first subset of unit cells to be active and a second subset of unit cells to be inactive, wherein the first subset of unit cells is disjoint from the second subset of unit cells;
   individually addressing the unit cells in the second subset of unit cells, while maintaining the unit cells in the second subset inactive, in order to control an optical property of the unit cell to one of at least a first condition of the optical property and a second condition of the optical property, wherein the second subset of unit cells is programmed by the individually addressing of the unit cells for forming a distribution of the three-dimensional light field;
   jointly switching the first subset of unit cells to be inactive; and
   jointly switching the second subset of unit cells to be active for changing the distribution of the three-dimensional light field to the distribution programmed in the second subset of unit cells.

* * * * *